(12) United States Patent
Tamura et al.

(10) Patent No.: US 7,681,236 B2
(45) Date of Patent: Mar. 16, 2010

(54) UNAUTHORIZED ACCESS PREVENTION SYSTEM

(75) Inventors: Naohiro Tamura, Kawasaki (JP); Takuya Habu, Kawasaki (JP); Mayuko Morita, Kawasaki (JP); Satoru Torii, Kawasaki (JP); Osamu Koyano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1166 days.

(21) Appl. No.: 10/790,655

(22) Filed: Mar. 1, 2004

(65) Prior Publication Data

US 2004/0187034 A1      Sep. 23, 2004

(30) Foreign Application Priority Data

Mar. 18, 2003      (JP)      ............................. 2003-074546

(51) Int. Cl.
*G08B 23/00*      (2006.01)
*G06F 12/14*      (2006.01)
(52) U.S. Cl. .......................................... 726/23; 726/24
(58) Field of Classification Search .................. 726/24, 726/23
See application file for complete search history.

(56) References Cited

U.S. PATENT DOCUMENTS 5,931,946 A * 8/1999 Terada et al. ................... 726/25
6,715,083 B1 * 3/2004 Tovander ....................... 726/23

2002/0078202 A1   6/2002 Ando et al.
2004/0003286 A1 * 1/2004 Kaler et al. .................. 713/201
2004/0148520 A1 * 7/2004 Talpade et al. .............. 713/201

FOREIGN PATENT DOCUMENTS

| JP | 07-141296 | 6/1995 |
|---|---|---|
| JP | 2000-124952 | 4/2000 |
| JP | 2000-261483 | 9/2000 |
| JP | 2002-164938 | 6/2002 |
| JP | 2002-185539 | 6/2002 |

OTHER PUBLICATIONS

Kevin J. Houle, et al., "Trends in Denial of Service Attack Technology (CERT Coordination Center)"; URL: http//www.cert.org/archive/pdf/DoS_trends.pdf, Oct. 2001.
Dittrich, Dave, "Distributed Denial of Service (DDoS) Attacks/Tools," http://staff.washington.edu/dittrich/misc/ddos>, originally retrieved Feb. 17, 2003. (Attached copy is an updated copy of publication indicating latest modification date of Mar. 13, 2009, which copy was retrieved on Apr. 30, 2009).

* cited by examiner

*Primary Examiner*—Kambiz Zand
*Assistant Examiner*—William S Powers
(74) *Attorney, Agent, or Firm*—Greer, Burns & Crain, Ltd.

(57) ABSTRACT

An unauthorized access prevention system that includes a search unit searching the flowing-in path of the unauthorized access to the services by a Web system disclosed by a user's ISP, a determination unit determining the place to implement a countermeasure for protecting the services from the unauthorized access based on the result of the search, and a notification unit notifying, according to a determination that that the countermeasure is implemented in the flow source that makes the unauthorized access flow into the user's communication network, the determination to the flow source.

23 Claims, 15 Drawing Sheets

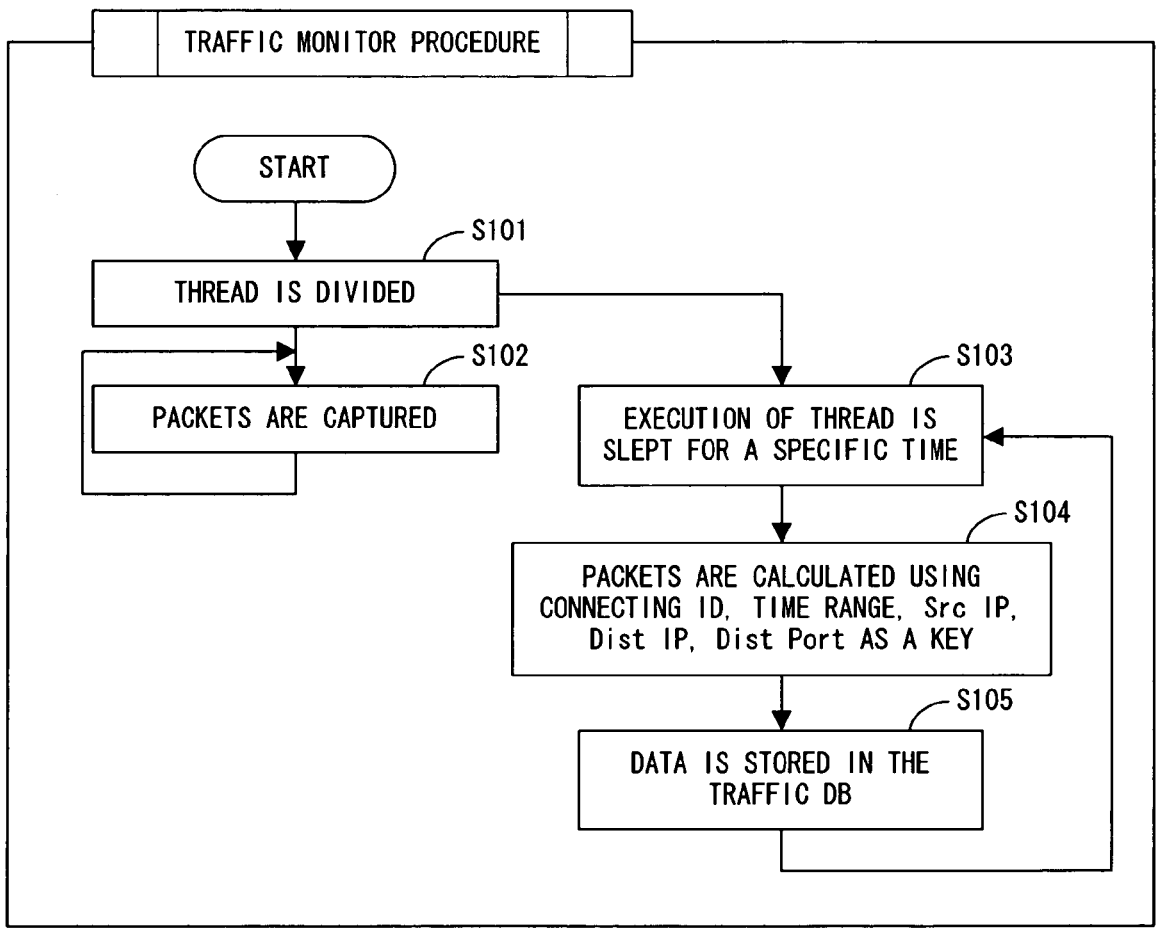
F I G. 5

| CONNECTING ID | TIME RANGE | Src IP | Dist IP | Dist Port | Count |
|---|---|---|---|---|---|
| ABC01234 | 10:00-10:10 | 202.248.20.254 | 202.248.20.68 | 80 | 1456 |
| NBC56780 | 10:00-10:10 | 202.248.20.112 | 202.248.20.68 | 80 | 35724 |
| AS245 | 10:00-10:10 | 10.34.195.194 | 202.248.20.68 | 80 | 169043 |

FIG. 6

| DATA MEMBER | EXAMPLE 1 | EXAMPLE 2 |
|---|---|---|
| DETECTING ID | 00-00-0E-82-2E-74-0001 | 00-00-0E-82-2E-74-0002 |
| TIME RANGE START (GMT) | 2003/2/1 16:01:16 | 2003/2/17 11:31:11 |
| TIME RANGE END (GMT) | 2003/2/1 16:11:16 | 2003/2/17 11:41:11 |
| ATTACK CATEGORY | TCP Syn Flood | Worm |
| ORGANIZATION NAME | Company A | Company B |
| BELONGING ISP | ISP ABC | ISP XYZ |
| TARGET PROTOCOL | TCP | UDP |
| Src IP | 10.4.120.Z | 169.0.255.C |
| Dist IP | 192.168.X.Y | 164.71.A.B |
| Dist Port | 80 | 1434 |
| NUMBER OF UNAUTHORIZED PACKETS | 156789 | 876534 |
| ATTACK TOOL NAME | TFN2K | SQL Slammer |
| COUNTERMEASURE CANCELLATION POLICY | 10 MINUTES | 20 MIMUTES |

FIG. 8

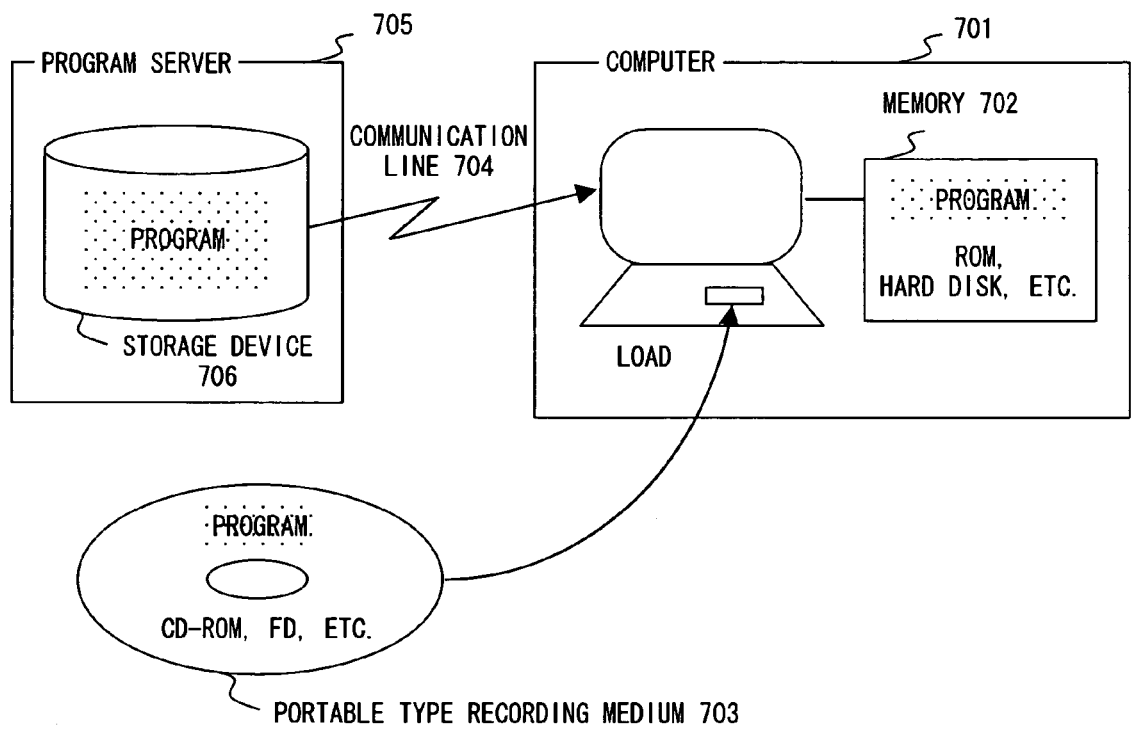
F I G. 1 5

UNAUTHORIZED ACCESS PREVENTION SYSTEM

BACKGROUND OF THE INVENTION

1. Field of the Invention

The present invention relates to an unauthorized access prevention technology, and more specifically to a technology for executing an unauthorized access prevention service that, for example, an Internet service provider (ISP) provides to its customers, and in particular to a technology to implement an effective countermeasure against unauthorized access that is represented by distributed denial of services.

2. Description of the Related Art

Denial of services (hereinafter abbreviated to "DoS") stands for an attack that makes a system stop operating or incapable of operating by purposely transmitting a processing demand that is beyond a tolerable limit of the system resource, and DoS is characterized in that it is difficult to discriminate a reasonable processing demand from an unreasonable processing demand. An attack made in the form in which many attack sources are distributed in a network is called distributed denial of services (hereinafter abbreviated to "DDoS"). DDoS is explained in full detail, for example, in the following publication.

"Trends in Denial of Service Attack Technology" by Kevin J. Houle and George M. Weaver published from CERT Coordination Center in October, 2001, retrieved on Feb. 17, 2003 by the Internet <URL:http://www.cert.org/archive/pdf/Dos_trends.pdf>

Conventional technologies to prevent DDoS are largely classified into the following two methods, and each of the two methods can be further subdivided as follows.

I. Method that Replaces the Constituents Used in the Present Network (1) Technology to Prevent DDoS by Expanding IP Packet This is the technology to make the search of an attacker source and the uniformity of each transmitter source that transmits a processing demand possible by adding return-path information to the IP packet as well as by replacing the present router or firewall by the one that can understand the expanded IP packet.

(2) Technology to Prevent DDoS Without Expanding IP Packet

Included in this technology is, for example, the technology disclosed in Japanese Unexamined Patent Publication No. 2002-164938. This technology is such that the router that receives a packet-filtering program that is propagated in an edge router and is transmitted to each router executes the program and shuts off the traffic from the attacker source, and the router that can receive and execute this program is used in place of a router used for the present network.

II. Method that Uses the Constituents as they are that are Used for the Present Network Described below are the details of this method with reference to FIG. 1. In a network constitution example shown in FIG. 1, a customer site 1000 operates a Web system 1001, and the customer site 1000 is equipped with a firewall 1002 to prevent unauthorized access to the Web system 1001.

The Web system 1001 is connected to an edge router 2001 via the firewall 1002. The edge router 2001 is managed by an ISP-A 2000 that is an Internet service provider.

An attacker that intends to perform DDoS against the Web system 1001 accesses a POP (point of presence) edge router 3001 managed by an ISP-B 3000 that is an Internet service provider that is logically adjacent to the ISP-A 2000 in the network and attacks the Web system.

A regular user who uses services of this Web system 1001 accesses the POP edge router 4001 managed by the ISP-C 3000 that is an Internet service provider adjacent to the ISP-A 2000 in the network and receives the services provided by the Web system 1001.

(1) Technology to Prevent DDoS by an Attack-Target Customer Site

This is the technology in which a system that employs an unauthorized access detection technology used in an intrusion detection system (hereinafter abbreviated to "IDS") and a packet control (such as filtering and flow-rate control) technology is arranged on the network border between the ISP-A 2000 and the customer site 1000 (in FIG. 1, arranged in the edge router 2001), and when said system detects any DDoS, said system shuts off only a specific unauthorized packet that flows from the ISP-A 2000 to the customer site 1000.

(2) Technology to Prevent DDoS by a Single ISP

This is the technology in which the IDS is arranged on the network border between the ISP-A 2000 and the customer site 1000 (in FIG. 1, arranged in the edge router 2001), a packet control device is arranged on the network border between the ISP-A 2000 and the adjacent ISP (in FIG. 1, arranged in the edge routers 2002 and 2003), and when the IDS detects any unauthorized access, the IDS identifies the flow source of the packet using an IP traceback technology that identifies the upstream flow of an attack packet that pretends to be a transmitter source, and shuts off only an unauthorized packet on the border between the ISP 2000 and the adjacent ISP (in FIG. 1, the edge router 2002).

(3) Technology to Prevent DDoS by Cooperation of a Plurality of ISPs

This is the technology that is realized when the manager of ISP-A 2000 who has identified that the ISP adjacent to the flow source is the ISP-B 3000 based on the technology to prevent DDoS by a single ISP described in the preceding item asks the manager of ISP-B 3000 manually by telephone to take a countermeasure. As a result, this technology has not been established yet at the moment.

Information on the technologies with regard to DDoS is available from the following publication. "Distributed Denial of Service (DDoS) Attacks/Tools" by Dave Dittrich, retrieved on Feb. 17, 2003 on the Internet <URL: http://staff.washington.edu/dittrich/misc/ddos>

It can be said that to prevent DDoS at a place closer to the attack transmitter source located on the path from the attack transmitter source to the attack-target customer site is a more effective countermeasure. This is because if a countermeasure is implemented at a place closer to the attack-target customer site, the attack-target customer site can be protected, but since the DDoS cannot be prevented due to the congestion of networks on the path and the processing delay of the routers, the situation is after all the same as the fact that the service is nullified to the user who uses the service of the site from the Internet.

In the method mentioned in I among the methods described above, DDoS cannot be prevented without replacing the router used in the present network by the router provided with a new protocol, thus entailing expenditure for replacing the router. In addition, there is a problem in that it takes a considerably long time until a new protocol and a router that can handle the new protocol are widely spread.

Furthermore, since the reliability of communications cannot be ensured in the state in which DDoS is occurring, the router cannot receive the program in the technology disclosed in Japanese Unexamined Patent Publication No. 2002-164938 mentioned above, and as a result, the traffic from the attacker source might not be shut off. In the technology disclosed in this publication, on the other hand, the router itself might become an attack target of DDoS. Also, in the technology disclosed in this publication, an action for propagating a program is performed, but this action is not familiar with the way of thinking about a security policy in each organization, so that the employment of this technology is left over, and a DDoS might not be prevented cross-sectionally throughout the whole organization.

With regard to the method of II among the methods described above, there are considered to be the following problems.

First of all, in the technology to prevent DDoS by an attack-target customer site, a countermeasure is implemented on the border between the ISP and the attack-target customer site, so that it is not possible to take any effective measure for the congestion of networks in the ISP and the deterioration of the processing capability of the router. Consequently, the influence that the DDoS gives to other customers of the ISP cannot be prevented.

In the example shown in FIG. 1, a countermeasure against the DDoS by an attacker to the Web system 1001 via the ISP-B 3000 is implemented in the edge router 2001, and this method influences the provision of services to a regular user who accesses the Web system 1001 via the ISP-C 4000.

Next, in the technology to prevent DDoS by a single ISP, since a countermeasure is implemented on the border between an ISP and an adjacent ISP, the influence to the network in the user's ISP becomes minimal. However, this technology cannot cope with the congestion of networks and the deterioration of the processing capability of the router, and as a result, it cannot prevent the influence that a regular packet that flows from the adjacent ISP to the user's ISP receives. Moreover, since a countermeasure can be implemented only on the network border that is connected at all times, this technology cannot appropriately prevent the attack received from the transiently-connected network in which a connecting substance changes with a lapse of time.

In the example shown in FIG. 1, as a countermeasure is implemented by the edge router 2002 against DDoS by an attacker to the Web system via the ISP-B 3000, this method little influences the provision of services to a regular user who accesses the Web system 1001 via the ISP-C 4000, but it does influence the provision of services to a regular user who accesses the Web system 1001 via the ISP-B 3000. Moreover, in the case of FIG. 1, when an attacker who attacks the Web system 1001 by connecting the Web system 1001 to the POP edge router 3001 that the ISP-B 3000 manages once cuts off the connection of the Web system 1001 to the POP edge router 3001 and connects the Web system 1001 to the POP edge router 3001 again, the IP address of the attacker source changes, so it is difficult to implement the countermeasure by the edge router 2002 that the ISP-A 2000 manages.

In the case of the technology to prevent DDoS by cooperation of a plurality of ISPs, a countermeasure can be implemented at a place closer to the attack transmitter source, but under the present circumstances, the managers of ISPs must communicate with each other by telephone and cope with problems while respecting both parties' security policy, thereby requiring a tremendous amount of time to work out the countermeasure. In addition, since there is no method for attesting each person in charge at each ISP, problems such as reliability of information in operating the system and pretending to be a person in charge at an ISP arise in this technology.

There is another problem in that when the technology to prevent DDoS by cooperation of a plurality of ISPs is employed, the operation history is not recorded.

SUMMARY OF THE INVENTION

The purpose of the present invention is to provide a technology to deny unauthorized-access information intrusion in order to prevent any DDoS effectively by implementing a countermeasure against unauthorized access at as close a place to an unauthorized-access transmitter source as possible by the cooperation of a plurality of ISPs.

The unauthorized access prevention system that is one of the embodiments of the present invention comprises a search unit searching the flowing-in path of unauthorized access to the services disclosed from the user's communication network; a determination unit determining the place to implement the countermeasure for protecting the services from the unauthorized access based on the result of the search; and a notification unit notifying, according to the determination that the countermeasure is implemented at the flow source that transmits the unauthorized access to the user's communication network, the determination to the flow source.

According to this constitution, the determination that the countermeasure against unauthorized access to the services disclosed from the user's communication network is implemented at the flow source that transmits unauthorized access to the user's communication network is notified to the flow source, so it is possible to implement the countermeasure against the unauthorized access at a place closer to the flow source, namely the transmitter source that transmits the unauthorized access. As a result, an effective countermeasure against DDoS can be implemented.

BRIEF DESCRIPTION OF THE DRAWINGS

The present invention will be more apparent from the following detailed description when the accompanying drawings are referenced.

FIG. 5 shows the contents of traffic monitor procedure;

FIG. 6 shows the data structure of a traffic database;

FIG. 8 shows the data format for unauthorized access notification;

FIG. 15 shows an example of a recording medium from which a computer can read a stored control program.

DESCRIPTION OF THE PREFERRED EMBODIMENTS

Described below are the embodiments of the present invention. Firstly, described below is the configuration of the principle of the unauthorized access prevention system embodying the present invention with reference to FIG. 2.

Figure 1:
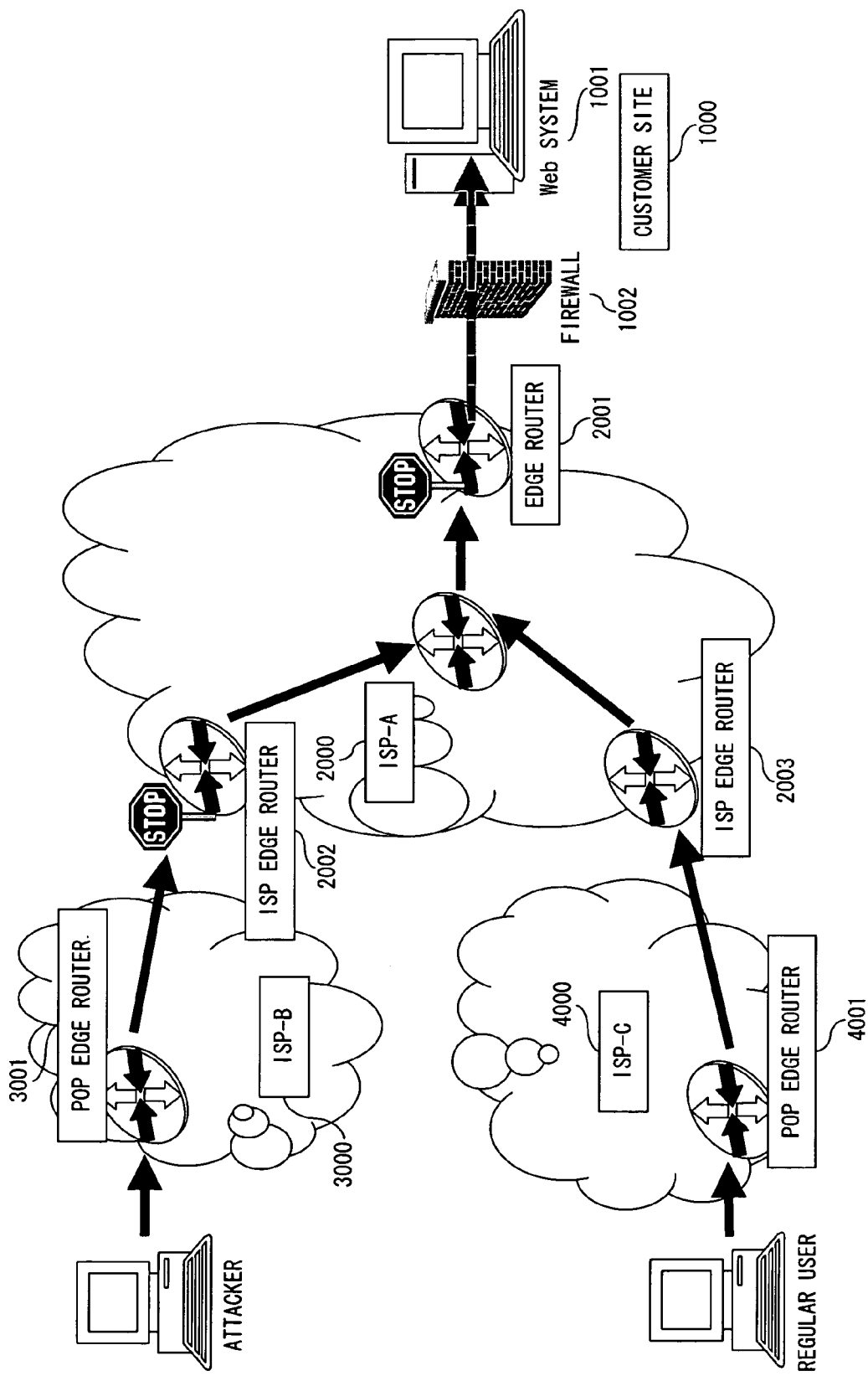
FIG. 1 shows the outline of a conventional unauthorized access prevention system.
Figure 2:
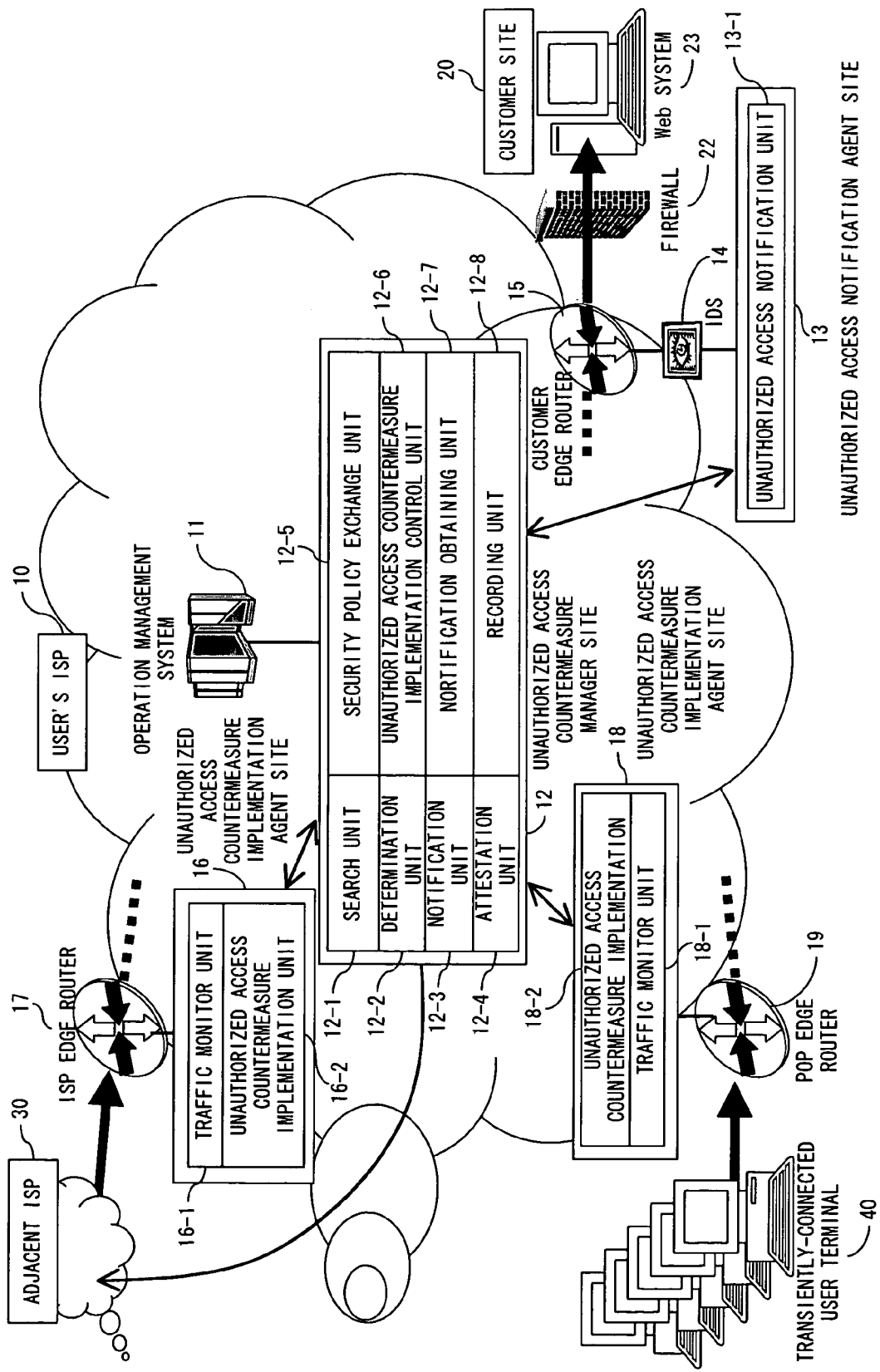
FIG. 2 shows the configuration of the principle of the present invention.

In FIG. 2, a user's ISP (Internet service provider) 10 is the user's communication network, and its operation is managed by an operation management system 11.

The Web system 21 of a customer site 20 discloses Web services from the user's ISP 10, and the Web system 21 if the customer site 20 is connected to a customer edge router 15 that is managed by the user's ISP 10 via a firewall 22.

An IDS (intrusion detection system) 14 detects unauthorized access to the Web system 21 of the customer site 20 at the customer edge router 15, and analyzes the contents of the unauthorized access that has been detected.

An unauthorized access notification agent site 13 is provided with an unauthorized access notification unit 13-1 as occasion arises, and the unauthorized access notification agent site 13 transmits information obtained from the IDS 14 to an unauthorized access countermeasure manager site 12.

The unauthorized access countermeasure manager site 12 comprises a search unit 12-1, a determination unit 12-2, a notification unit 12-3, an attestation unit 12-4, a security policy exchange unit 12-5, an unauthorized access countermeasure control unit 12-6, a notification obtaining unit 12-7, and a recording unit 12-8 as occasion arises, and the unauthorized access countermeasure manager site 12 instructs the unauthorized access countermeasure implementation agent sites 16 and 18 to implement the countermeasure against the unauthorized access to the Web system 21 in the customer site 20.

The unauthorized access countermeasure implementation agent site 16 comprises a traffic monitor unit 16-1 and an unauthorized access countermeasure implementation unit 16-2 as occasion arises, and the unauthorized access countermeasure implementation agent site 16 implements the countermeasure against unauthorized access to the Web system 21 in the customer site 20 in the ISP edge router 17 that connects the user's ISP 10 and the adjacent ISP 30 that is a communication network logically adjacent to user's ISP 10.

The unauthorized access countermeasure implementation agent site 18 comprises a traffic monitor unit 18-1 and an unauthorized access countermeasure implementation unit 18-2 as occasion arises, and the transiently-connected user terminal 40 that is used by a user who does not connect a network at all times (namely by a transiently-connected user) among the users who use their ISP implements the countermeasure against the unauthorized access to the Web system 21 in the customer site 20 in the POP (point of presence) edge router 17 between his ISP and the POP that he connects to use his ISP.

The unauthorized access manager site 12, unauthorized access notification agent site 13, and unauthorized access countermeasure implementation agent sites 16 and 18 constituted as shown in FIG. 2 especially relate to the present invention.

The unauthorized access prevention system that is one of the embodiments of the present invention includes: the search unit 12-1 searching the flowing-in path of unauthorized access to the services disclosed from the user's communication network; the determination unit 12-2 determining the place to implement the countermeasure for protecting the services from the unauthorized access based on the result of the search; and the notification unit 12-3 notifying, according to a determination that the countermeasure is implemented at the flow source that transmits unauthorized access to the user's communication network, the determination to the flow source.

According to this constitution, the determination that the countermeasure against the unauthorized access to the services (Web services by the Web system 21) disclosed from the user's communication network (user's ISP 10) is implemented at the flow source that transmits the unauthorized access to the user's communication network is notified to the flow source, so that it is possible to implement the countermeasure against the unauthorized access at a place closer to the flow source, namely the transmitter source that transmits the unauthorized access. As a result, an effective countermeasure against DDoS can be implemented.

In the unauthorized access prevention system embodying the present invention, the search unit 12-1 can be made to perform the search when the unauthorized access is detected or can be made to perform the search when it is notified to the flow source that the unauthorized access has been detected.

In FIG. 2, unauthorized access is detected by the IDS 14, and the unauthorized access detected by the IDS 14 is notified to the unauthorized access countermeasure manager site 12 by the unauthorized access notification unit 13-1.

Thus, it is possible to implement the countermeasure against unauthorized access promptly.

Also, in the unauthorized access prevention system embodying the present invention, the search unit 12-1 can be made to search the flowing-in path based on the monitoring information on the traffic transmitted by the user's communication network and the unauthorized access information indicating the contents of the unauthorized access.

In FIG. 2, the monitoring information on the traffic transmitted by the user's communication network, namely the user's ISP 10 is obtained by the operation management system 11, and unauthorized access information is obtained by the IDS 14. Since the characteristics of the unauthorized access are made clear by this unauthorized access information, the flowing-in path of the unauthorized access can be made clear by finding the traffic having characteristics similar to the said characteristics from the monitoring information.

The monitoring information can be such that it includes at least the position information of the edge router arranged on the border between the user's communication network and the communication network adjacent to the user's communication network and the monitoring information on the traffic that flows into the user's communication network via the edge router.

In FIG. 2, the position information of the edge router (ISP edge router 17) is obtained by the operation management system 11, and the monitoring information on the traffic that flows into the user's communication network via the edge router is obtained by the traffic monitor unit 16-1. Therefore, it can be made clear from where the unauthorized access having the characteristics indicated by the unauthorized access information flows into the user's ISP by finding out the traffic having characteristics similar to these pieces of information from the monitoring information.

The traffic monitor unit 16-1 can grasp a flowing-in packet whose transmitter source address is disguised by recording the number of packets flowing in via the ISP edge router 17 for every unit hour and for every connection destination side, using, for example, the transmitter source address, transmission destination address or transmission destination port number as a key.

The traffic monitor unit 18-1 can also grasp the flowing-in packet that flows in from the transiently-connected user terminal 40 via the POP edge router 19 by performing the same recording as that performed by the traffic monitor unit 16-1.

More preferably, the traffic monitor units 16-1 and 18-1 can be made to obtain information on the connection destination side in cooperation with the operation management unit 11.

Also, in the unauthorized access prevention system embodying the present invention, the notification unit 12-3 can be made to notify the determination to the flow source after mutual attestation is performed between the notification unit 12-3 and the flow source of the unauthorized access.

In FIG. 2, this mutual attestation is performed by the attestation unit 12-4. Thus, it is possible to prevent the theft of the notification of the determination by a third party who pretends to be the flow source.

The connection protocol for this mutual attestation between the notification unit and the flow source can be, for example, Hypertext Transfer Protocol Security (hereinafter abbreviated to "HTTPS"), and the attestation method used for this mutual attestation can be, for example, Public Key Infrastructure (hereinafter abbreviated to "PKI"), and an electronic certificate can be, for example, one in the form based on the recommendation X.509 of the International Telecommunication Union (hereinafter abbreviated to "ITU").

Also, in the unauthorized access prevention system embodying the present invention, the notification unit 12-3 can be made to notify the determination to the flow source after the notification unit 12-3 exchanges information on the security policy for network operation with the flow source that transmits the unauthorized access.

In FIG. 2, the information exchange of this security policy is conducted by a security policy exchange unit 12-5. Thus, even if the security policy differs from that of the flow source, it is possible to adjust the difference and ask the flow source to implement a countermeasure against unauthorized access.

Data code type information and time zone information can be exchanged as the information on a security policy, and a HTTPS protocol can be used when data code type information is exchanged.

The information on a security policy can be the information indicating the time that is required till the countermeasure against the unauthorized access is cancelled after the unauthorized access is not detected any more.

Thus, even if the security policy differs as to the time that is required till the countermeasure against the unauthorized access is cancelled after the unauthorized access is not detected any more, it is possible to ask the flow source to implement a countermeasure against the unauthorized access in accordance with the security policy.

At that time, if the time indicated by the information on the security policy differs between the user's communication network and the flow source, a shorter time of the two can be the time that is required till the countermeasure against the unauthorized access is cancelled after the unauthorized access is not detected any more.

Thus, it is possible to ask the flow source to implement the countermeasure against unauthorized access in accordance with the security policy that is acceptable between user's communication network and the flow source.

At that time, the notification unit 12-3 can be made to notify the flow source of the determination and the time that is required till the countermeasure against the unauthorized access is cancelled after the unauthorized access is not detected any more.

Thus, the setting of said time in accordance with the security policy that is acceptable between the user's communication network and the flow source is notified to the flow source.

Also, in the unauthorized access prevention system embodying the present invention, the notification unit 12-3 can be made to notify the determination to the flow source using the communication path that differs from the flowing-in path of the unauthorized access.

The flowing-in path of the unauthorized access cannot be sometimes used as a communication path owing to the influence of DDoS. Thus, even if such an instance occurs, the determination can be notified to the flow source.

Also, in the unauthorized access prevention system embodying the present invention, when it is determined that the countermeasure is implemented in the flow source that makes the unauthorized access flow into the user's communication network, the notification unit 12-3 judges whether said unit notifies the determination to the flow source, and an unauthorized access countermeasure implementation control unit 12-6 that has the countermeasure for protecting the services from the unauthorized access implemented in the user's communication network when the notification unit 12-3 judges that said unit will not notify the determination to the flow source can be further included.

Thus, for example, even when the countermeasure is not implemented in the flow source even though the determination is notified to the flow source, it is possible to properly prevent such unauthorized access.

The determination can be performed based on the judgement information on the flow source that is given in advance.

Thus, for example, when it is known in advance that the countermeasure is not implemented in the flow source even though the determination is notified to the flow source, it is possible to prevent such unauthorized access by giving information indicating this fact as judgement information in advance.

Also, in the unauthorized access prevention system embodying the present invention, the unauthorized access countermeasure implementation control unit 12-6 that makes the countermeasure for protecting the services from the unauthorized access implemented in the user's communication network based on the determination that the countermeasure is implemented in the user's communication network can be further included.

Thus, when the unauthorized access is transmitted from the user's communication network (user's ISP 10), it is possible to appropriately prevent such unauthorized access in the user's communication network.

In FIG. 2, for example, when unauthorized access to the Web system 2 flows from an adjacent ISP 30 to the user's ISP, the unauthorized access countermeasure implementation control unit 12-6 instructs the unauthorized access countermeasure implementation agent 16 to implement the countermeasure against the unauthorized access by the ISP edge router 17. The unauthorized access countermeasure implementation unit 16-2 that is provided in the unauthorized access countermeasure implementation agent 16 controls the ISP edge router 17 according to this instruction and makes the ISP edge router 17 shut off this unauthorized access from the adjacent ISP 30.

The unauthorized access countermeasure implementation control unit 12-6 can be made to implement the countermeasure in the POP (point of presence) edge router to which the transmitter source that transmits the unauthorized access is connected.

In FIG. 2, for example, when a transiently-connected user terminal 40 is the transmitter source that transmits unauthorized access to the Web system 21, the unauthorized access countermeasure implementation control unit 12-6 instructs the unauthorized access countermeasure implementation agent 18 to implement the countermeasure against the unauthorized access in the POP edge router 19. The unauthorized access countermeasure implementation unit 18-2 that is provided in the unauthorized access countermeasure implementation agent 18 controls the POP edge router 19 according to this instruction, and makes the POP edge router 19 shut off the unauthorized access from the transiently-connected user terminal 40.

The unauthorized access countermeasure implementation control unit 12-6 can be made to identify the POP edge router 19 to which the transmitter source that transmits the unauthorized access is connected based on the information obtained from the operation management system 11 that manages the operation of the user's communication network (user's ISP 10).

In a POP connection, in general, an identifier that is allocated to identify a specific terminal in a communication network differs every time the POP connection is performed. If the POP connection is newly performed by the transiently-connected user terminal 40 that is the transmitter source that transmits the unauthorized access, a different identifier is allocated to the transiently-connected user terminal 40, and consequently, an appropriate countermeasure against the unauthorized access cannot be implemented sometimes. However, since this allocation is managed by the operation management system 11, it is possible to shut off the unauthorized access from the transiently-connected user terminal 40 in the POP edge router 19 by using this allocation information even if the POP connection is newly performed and a different identifier is allocated.

Also, a notification obtaining unit 12-7 obtaining a notification of the determination that unauthorized access to the services disclosed from a communication network different from the user's communication network is made to flow into the said other communication network can be further included, and when the notification is obtained by the notification unit 12-7, the unauthorized access countermeasure implementation control unit 12-6 can be made to implement the countermeasure for protecting the services disclosed from the other communication network from the unauthorized access related to said notification in the user's communication network.

Thus, it is possible to implement an appropriate countermeasure against the unauthorized access at a place closer to the user's communication network that makes the unauthorized access to the services disclosed from the other communication network flow into the other communication network, namely the transmitter source that transmits the unauthorized access.

Also, the countermeasure implemented by the unauthorized access countermeasure implementation control unit 12-6 can be cancelled after the unauthorized access is not detected any more and the preset time passes.

This preset time can be set based on the security policy on network operation of both the user's communication network and the other communication network.

Thus, the influence that authorized access suffers owing to the countermeasure implemented against unauthorized access can be dissolved after the unauthorized access stops and the preset time passes.

At that time, if the time set between the user's communication network and the other communication network based on the security policy on network operation of both networks differs between both networks, the countermeasure can be cancelled after the unauthorized access is not detected any more and a shorter time of the two passes.

Thus, the time that is required until the influence that authorized access suffers owing to the countermeasure implemented against unauthorized access is dissolved can be the time that complies with the security policy acceptable between the user's communication network and the other communication network.

Also, in the unauthorized access prevention system embodying the present invention, the notification obtaining unit 12-7 obtaining a notification of the determination that unauthorized access to the services disclosed from a communication network different from the user's communication network is made to flow into said other communication network can be further included; when the notification is obtained by the notification obtaining unit 12-7, the search unit 12-1 can be made to search the flowing-in path of the unauthorized access related to said notification in the user's communication network; when the notification is obtained by the notification obtaining unit 12-7, the determination unit 12-2 can be made to determine the place to implement the countermeasure for protecting the services disclosed from the other communication network from the unauthorized access related to said notification based on the result of the search; and when the notification is obtained by the notification obtaining unit 12-7, the notification unit 12-3 can be made to notify, according to a determination that the countermeasure is implemented in the flow source that makes the unauthorized access related to said notification flow into the user's communication network, the determination to the flow source.

Thus, it is possible to implement an appropriate countermeasure against the unauthorized access in the upstream flow source above the one that transmits unauthorized access to the services disclosed from the other communication network into the user's communication network, namely at a place close to the transmitter source that transmits the unauthorized access.

At that time, when the notification obtained by the notification obtaining unit 12-7 is the same as that obtained in the past, the unauthorized access countermeasure implementation control unit 12-6 that makes the countermeasure for protecting the services disclosed from the user's communication network or the other communication network from the unauthorized access related to said notification implemented in the communication network of the notification source of said notification can be further included.

When the notification obtained by the notification obtaining unit 12-7 is the same as that obtained in the past, it can be considered that the notification is only repeated after that and that there is a fear that no countermeasure against the unauthorized access is implemented at all. According to the above-mentioned constitution, it is possible to implement an appropriate countermeasure against the unauthorized access even in such an instance.

At that time, when the notification unit 12-3 notifies said notification, the notification unit 12-3 can be made to notify the information that uniquely identifies the unauthorized access related to said notification.

Thus, the unauthorized access countermeasure implementation control unit 12-6 can judge whether the notification obtained by the notification obtaining unit 12-7 is ascribed to the one by the user's notification unit 12-3 based on the information that uniquely identifies the unauthorized access related to said notification and included in said notification.

Also, in the unauthorized access prevention system embodying the present invention, a recording unit 12-8 recording the history of the notification performed by the notification unit 12-3 can be further included.

According to this constitution, it is possible to grasp the state in which the manager of the user's communication network (user's ISP 10) asks the flow source to implement the countermeasure against the unauthorized access from this history record.

It is possible to obtain the same function and effect as those obtained by the unauthorized access prevention system embodying the present invention by directing a computer to execute the program that makes the computer execute the same processing as that performed by each component of the unauthorized access prevention system embodying the present invention.

Even the method comprising the procedures that are carried out by each component of the unauthorized access prevention system embodying the present invention can solve the above-mentioned problem because the same function and effect obtained with the unauthorized access prevention system embodying the present invention can be obtained by using the said method.

Figure 3:
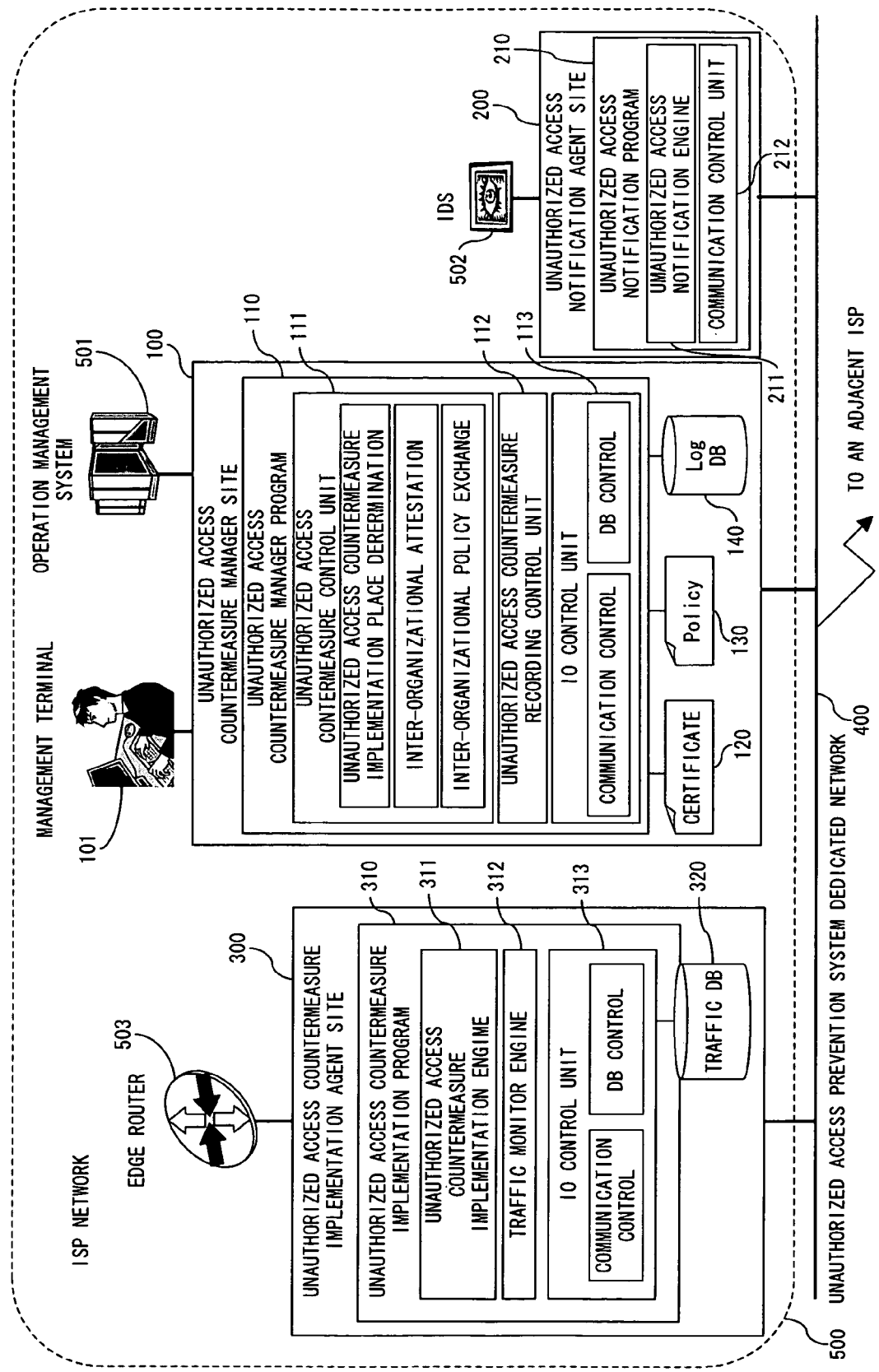
FIG. 3 shows the configuration of the function of the unauthorized access prevention system embodying the present invention.

Next, FIG. 3 is described below.

FIG. 3 shows the configuration of the function of the unauthorized access prevention system embodying the present invention. This system is constituted in such a way that an unauthorized access countermeasure manager site 100, an unauthorized access notification agent site 200, and an unauthorized access countermeasure implementation agent site 300 are connected by an unauthorized access prevention system dedicated network 400, and is constructed in an ISP network 500 that is the user's communication network. This system functions by cooperating with an operation management system 501 and an IDS (intrusion detection system) 502 that detects unauthorized access.

The unauthorized access countermeasure manager site 100 is a computer that executes an unauthorized access countermeasure manager program 110. The unauthorized access countermeasure manager site 100 has two communication interfaces. One communication interface is connected to the ISP network 500, and the other to the unauthorized access prevention system dedicated network 400. However, no routing is performed between the two networks.

When the unauthorized access countermeasure manager program 110 is executed, an unauthorized access countermeasure control unit 111, an unauthorized access countermeasure recording control unit 112, and an IO control unit 113 are constituted.

The unauthorized access countermeasure control unit 111 calls a function for determining an unauthorized access countermeasure implementation place, a function for performing an inter-organizational attestation, and a function for performing a policy exchange, and controls the order of execution of each function. The unauthorized access countermeasure recording control unit 112 controls the recording of the history of the contents of the countermeasures implemented by this unauthorized access prevention system against unauthorized access.

The IO control unit 113 controls communications performed in the ISP network 500 and the unauthorized access prevention system dedicated network 400, and controls the data operation of the DB (database) provided in the unauthorized access countermeasure manager site 100.

A certificate 120 is used when inter-organizational attestation is performed by the unauthorized access countermeasure control unit 111, and said certificate is, for example, the one in the form based on the recommendation X.509 of ITU (International Telecommunication Union).

A Policy 130 is an information file in which a security policy of the ISP network 500 is indicated. A Log DB 140 is a database in which the history of the contents of the countermeasures implemented by this unauthorized access prevention system against unauthorized access is recorded.

A management terminal 101 provides a user interface for this unauthorized access prevention system to the manager of the ISP network 500, and the management terminal 101 is a computer that has a CPU, memory, display, communication interface, etc. A personal computer and a personal digital assistant (hereinafter abbreviated to "PDA"), for example, can be used as the management terminal 101.

An unauthorized access notification agent site 200 is a computer that executes an unauthorized access notification program 210. The unauthorized access notification agent site 200 has two interfaces, and one interface is connected to the ISP network 500, and the other to the unauthorized access prevention system dedicated network 400. However, no routing is performed between these two networks.

When the unauthorized access notification program 210 is executed, an unauthorized access notification engine 211 and a communication control unit 212 are constituted.

The unauthorized access notification engine 211 obtains information on the unauthorized access detected by an IDS 502 from the IDS 502 and controls the notification of the information to the unauthorized access countermeasure manager site 100.

The communication control unit 212 controls communications in the ISP network 500 and the unauthorized access prevention system dedicated network 400. An unauthorized access countermeasure implementation agent site 300 is a computer that executes an unauthorized access countermeasure implementation program 310. The unauthorized access countermeasure implementation agent site 300 has two communication interfaces, and one of them is connected to the ISP network 500, and the other to the unauthorized access prevention system dedicated network 400. However, no routing is performed between these two networks.

When the unauthorized access countermeasure implementation program 310 is executed, an unauthorized access countermeasure implementation engine 311, a traffic monitor engine 312, and an IO control unit 313 are constituted.

The unauthorized access countermeasure implementation engine 311 controls an edge router 503 based on the information transmitted from the unauthorized access countermeasure manager site 100 to shut off unauthorized access.

The traffic monitor engine 312 monitors the traffic that flows into the edge router 503 and controls the recording of the monitored information. The IO control unit 313 controls communications in the ISP network 500 and the unauthorized access prevention system dedicated network 400, and controls the data operation of the DB (database) provided in the unauthorized access countermeasure implementation agent site 300.

A traffic DB 320 is a database in which information on the traffic that flows into the edge router 503 is recorded.

An operation management system 501 is a system arranged in the ISP network 500 and manages the operation of the ISP network 500, and performs a constitution management of the ISP network 500, traffic management, obstacle management, account management, etc. The operation management system 501 cooperates with the unauthorized access countermeasure manager site 100 in delivering various kinds of data.

An IDS system 502 is arranged on the border of the customer network operated by the ISP 500 and a customer, more preferably on the side of the ISP network 500, and the IDS system 502 detects the unauthorized access transmitted from a malicious transmitter source. The IDS system 502 cooperates with the unauthorized access notification agent site 200 in delivering various kinds of data.

The edge router 503 is a router arranged on the border between the ISP network 500 and another communication network (an adjacent network) that is logically adjacent to the ISP network 500, or is a router arranged on the border between the ISP network 500 and the POP (point of presence) that a transiently-connected user terminal used by a user who does not connect the ISP network 500 at all times (namely, by a transiently-connecting user) among the users of the ISP networks 500 connects to use the ISP network 500. The edge router 503 cooperates with the unauthorized access countermeasure implementation agent site 300 in delivering various kinds of data. Shown in FIG. 3 is that only one unit of the edge router 503 is installed in the ISP network 500, but here in this description it is supposed that a plurality of edge routers 503 are installed in the ISP network 500.

The unauthorized access prevention system dedicated network 400 is a network different from the ISP network 500. An unauthorized access prevention system that is installed in the ISP network 500 is connected to the unauthorized access prevention system dedicated network 400. In addition, an unauthorized access prevention system having the same constitution as that shown in FIG. 3 that is installed in the adjacent network is connected to the unauthorized access prevention system dedicated network 400. Various kinds of data are transmitted and received between these unauthorized access prevention systems via the unauthorized access prevention system dedicated network 400.

Figure 4:
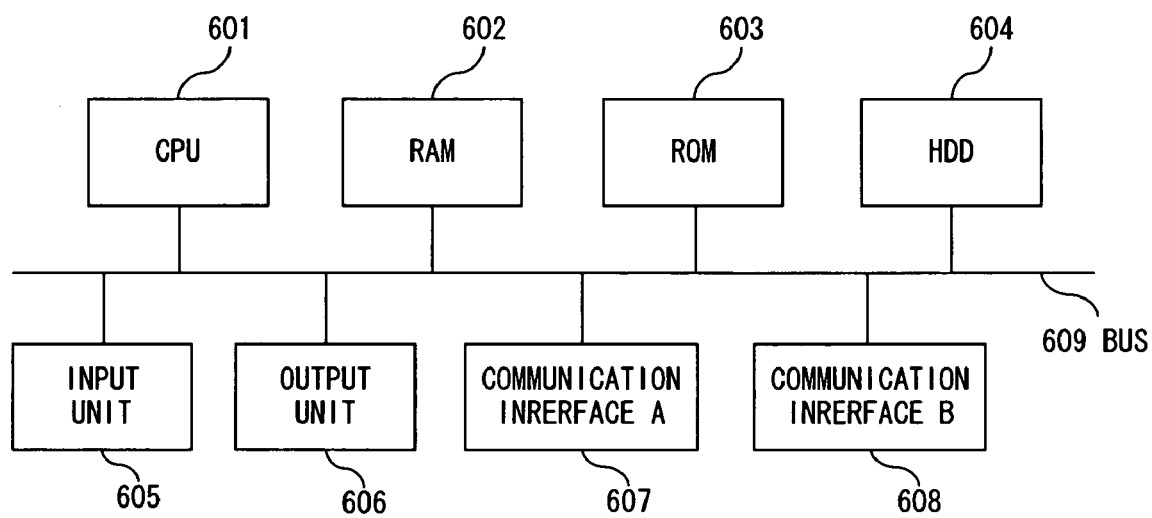
FIG. 4 shows an example of the hardware configuration of a computer to be used for the system shown in FIG. 3.

The unauthorized access countermeasure manager site 100, the unauthorized access notification agent site 200, and the unauthorized access countermeasure implementation agent site 300, all shown in FIG. 3, can be constituted by an individual computer that comprises hardware, for example, as shown in FIG. 4.

FIG. 4 is described below. A computer shown in FIG. 4 is constituted in such a way that a CPU 601, a RAM 602, a ROM 603, a HDD 604, an input unit 605, an output unit 606, a communication interface A 607 and a communication interface B 608 are mutually connected via a bus 609, and these devices can mutually transmit and receive data under the control of the CPU 601.

The CPU 601 is a central processing unit that controls the operation of this whole computer.

The RAM (Random Access Memory) 602 is used as a work memory when the CPU 601 executes various kinds of control programs. Also, the RAM 602 is used as a main memory that is used as a storage area to temporarily store various kinds of data as occasion arises.

The ROM (Read Only Memory) 603 is a memory in which a basic control program to be executed by the CPU 601 is stored in advance. When the computer is started, the CPU 601 can perform a basic control of this whole computer by executing the basic control program.

The HDD (Hard Disk Drive) 604 is a hard disk drive used as a database that keeps various kinds of data. Various kinds of control programs to be executed by the CPU 601 are stored in the HDD 604 in advance.

The input unit 605 receives input from outside and transfers the contents of the input to the CPU 601. The input unit 605 comprises, for example, an input device that receives instructions from an operator who operates this computer, such as a keyboard and a mouse, or a reading device for portable recording media such as a FD (Flexible Disk), a CD-ROM (Compact Disk-ROM), a DVD-ROM (Digital Versatile Disk-ROM), and an MO (Magneto-Optics) disk as needed.

The output unit 606 executes output in accordance with the instructions from the CPU 601, and the output unit 606 is, for example, a display device comprising a CRT (Cathode Ray Tube) and LCD (Liquid Crystal Display) that indicate various kinds of data, or a printer that prints and displays various kinds of data.

When this computer is used as the unauthorized access manager site 100, the management terminal 101 can be used as the input unit 605 or the output unit 606.

The communication interface A 607 connects this computer to the ISP network 500 to manage communications when data is transmitted to and received from another system.

The communication interface B 608 connects this computer to the unauthorized access prevention system dedicated network 400 to manage communications when data is transmitted to and received from another site comprising an unauthorized access prevention system installed in the ISP network 500 or when data is transmitted to and received from an unauthorized access prevention system installed in an adjacent network.

The computer shown in FIG. 4 comprises the above-mentioned constituents.

Described below are the contents of the process that is performed by each constituent by executing various kinds of programs specified in each site that constitutes the unauthorized access prevention system shown in FIG. 3.

In the unauthorized access prevention system shown in FIG. 3, a traffic procedure, unauthorized access notification procedure, unauthorized access countermeasure control procedure, and unauthorized access countermeasure recording procedure that will be described below are executed in parallel.

First, FIG. 5 is described below. FIG. 5 is a flowchart showing the contents of the traffic monitor procedure that is executed by a traffic monitor engine 312.

A thread is divided in S101. A repetitive procedure of S102 is executed, on one hand, and repetitive procedures of S103 to S105 are executed, on the other hand.

In S102, an IP (Internet Protocol) packet (hereinafter referred to simply as "packet") that flows into the edge router 503 is captured. After then, the procedure of S102 is repeated, and all the packets that flow into the edge router 503 are captured.

In S103, the execution of the thread from S103 to S105 is made dormant for a specific time, for example, for ten minutes, and after then the execution of the thread proceeds to S104 when the specified time passes.

In S104, the number of packets that are captured by the processing of S102 is calculated using Connecting ID, Time Range, Src IP, Dist IP, and Dist Port as a key. In S105, data that shows the result of the calculation is stored in a traffic DB 320 as monitor information. After this procedure of S105 is completed, the procedure is returned to S103 to repeat the above-mentioned procedure.

Next, FIG. 6 is described below. FIG. 6 shows the data structure of the traffic DB 320 in which data is stored according to the procedure of S105. Each field of "Connecting ID,"

"Time Range," "Src IP," "Dist IP," "Dist Port" and "Count" is provided for each record in the traffic DB 320, as shown in the same figure.

Connecting ID is the identifier that is individually allocated to a user of the ISP network 500. The relationship between the connecting ID and the packet that is the target for calculation can be obtained from the operation management system 501 by transmitting the Src IP indicated in the packet to the operation management system 501 and asking the operation management system 501 about the relationship.

Time Range is a set of starting time and terminating time for the calculation of packets.

Src IP is the IP address of a transmitter source indicated in the packets to be calculated.

Dist IP is the IP address of a destination side indicated in the packets to be calculated.

Dist Port is the port number of the destination side indicated in the packets to be calculated.

Count is the number of packets to be calculated that flow into the edge router 503 within the time indicated in the "Time Range."

The records of the first line in the data example shown in FIG. 6 are explained as follows. The records of the first line in the said data example indicate that a user who uses the ISP network 500 in which "ABC01234" is allocated as a connecting ID made "1456" packets whose transmitter source IP address is "202.248.20.254," whose destination side's address is "202.248.20.68" and whose destination side's port number is "80" flow into the edge router 503 within a time of "10:00-10:10."

The above-mentioned data is stored in the traffic DB 320 for each edge router 503.

The packets that flow into the edge router 503 are monitored by executing the traffic monitor procedure.

Figure 7:
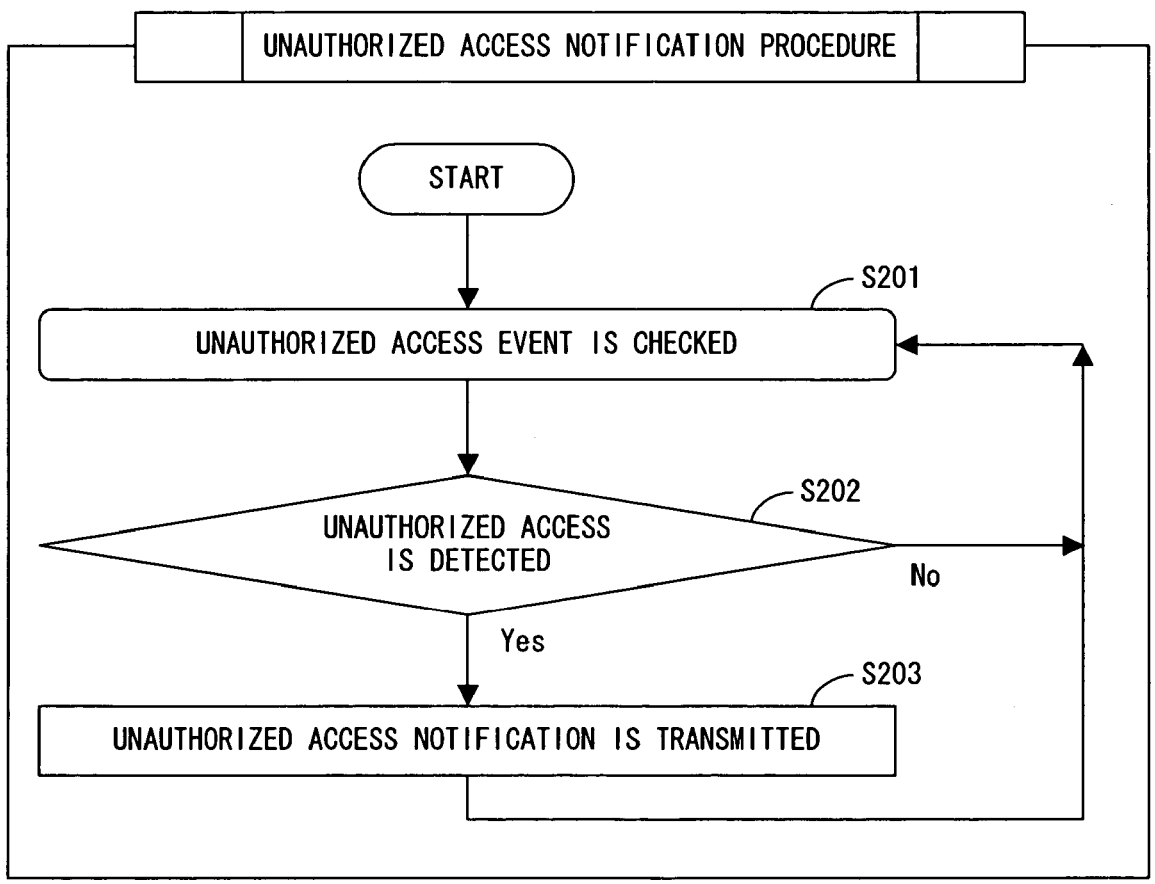
FIG. 7 shows the contents of unauthorized access notification procedure.

Next, described below is FIG. 7. FIG. 7 is a flowchart showing the contents of the unauthorized access notification procedure that is executed by the unauthorized access notification engine 211.

In S201, an unauthorized access event of the ID 502 is checked, and in S202, it is judged whether unauthorized access has been detected by the IDS 502. As a result of this operation, if unauthorized access is judged to have been detected (if the judgement result is yes), the procedure is made to proceed to S203. If unauthorized access is judged to have not been detected (if the judgement result is no), the procedure is returned to S201 to repeat the above-mentioned procedures.

In S203, the unauthorized access detected is notified to the unauthorized access countermeasure control unit 111 in the unauthorized access countermeasure manager site 100. After then, the procedure is returned to S201 to repeat the above-mentioned procedures.

FIG. 8 is described below. FIG. 8 shows the data format for the notification of unauthorized access to the unauthorized access countermeasure control unit 111 by the procedure of S203. Various information such as "Detecting ID," "Time Range Start," "Time Range End," "Attack category," "Organization Name," "Belonging ISP," "Target Protocol," "Src IP," "Dist IP," "Dist Port," "Number of Unauthorized Packets," "Attack Tool Name" and "Countermeasure Cancellation Policy" is included in this unauthorized access notification. These data can be obtained from the IDS 502.

Detecting ID is a unique identifier that, each time unauthorized access is detected, is assigned to the unauthorized access by the IDS 502. This Detecting ID can be an indicator that identifies individual DDoS.

Time Range Start and Time Range End are the date and time when the packet related to unauthorized access has been detected for the first time as well as the date and time when a specific time (for example, ten minutes) has passed since the date and time, and in the example of FIG. 8, these dates and times are indicated by Greenwich Mean Time (GMT).

Attack Category is a detailed category of DDoS that is the unauthorized access detected.

Organization Name is the name of the organization to which a system that receives unauthorized access belongs.

Belonging ISP is the name of the ISP to which an organization, to which a system that receives unauthorized access belongs, belongs.

Target Protocol is the protocol used for the connection to a system in which the unauthorized access receives DDoS.

Src IP is the IP address of a transmitter source indicated in the packet related to the unauthorized access.

Dist IP is the IP address of a destination side indicated in the packet related to the unauthorized access.

Dist Port is the port number of a destination side indicated in the packet related to the unauthorized access.

Number of Unauthorized Packets is the number of packets related to the unauthorized access identified by the Detecting ID.

Attack Tool Name is the tool name of the DDoS tool used for unauthorized access.

Countermeasure Cancellation Policy is the time required till the countermeasure against the unauthorized access is cancelled after the unauthorized access stops. This required time is set in advance within a range allowed by a security policy in the ISP 500 according to the instruction of, for example, a customer who receives the unauthorized access.

Described below is Example 1 out of the two data examples shown in FIG. 8. This example indicates that unauthorized access detected by the IDS 502 and identified by the Detecting ID "00-00-0E-82-2E-74-001" is a "TCP Syn Flood" attack detected from the Time Range Start of "2003/2/1 16:01:16"; this attack is performed by a "TCP" protocol to "Company A" that belongs to "ISP ABC"; the attacker uses an attacking tool of "TFN2K"; the IP address of the transmitter source is "192.168.X.Y"; "156789" packets whose destination side's port number is "80" are transmitted till the Time Range End of "2003/2/1 16:11:16"; and the countermeasure against this unauthorized access should be continued "for ten minutes" after the unauthorized access stops.

The contents of the detection of the unauthorized access to the customer network by the IDS 502 is notified to the unauthorized access countermeasure control unit 111 in the unauthorized access countermeasure manager site 100 by executing the above-mentioned unauthorized access notification procedure.

Figure 9:
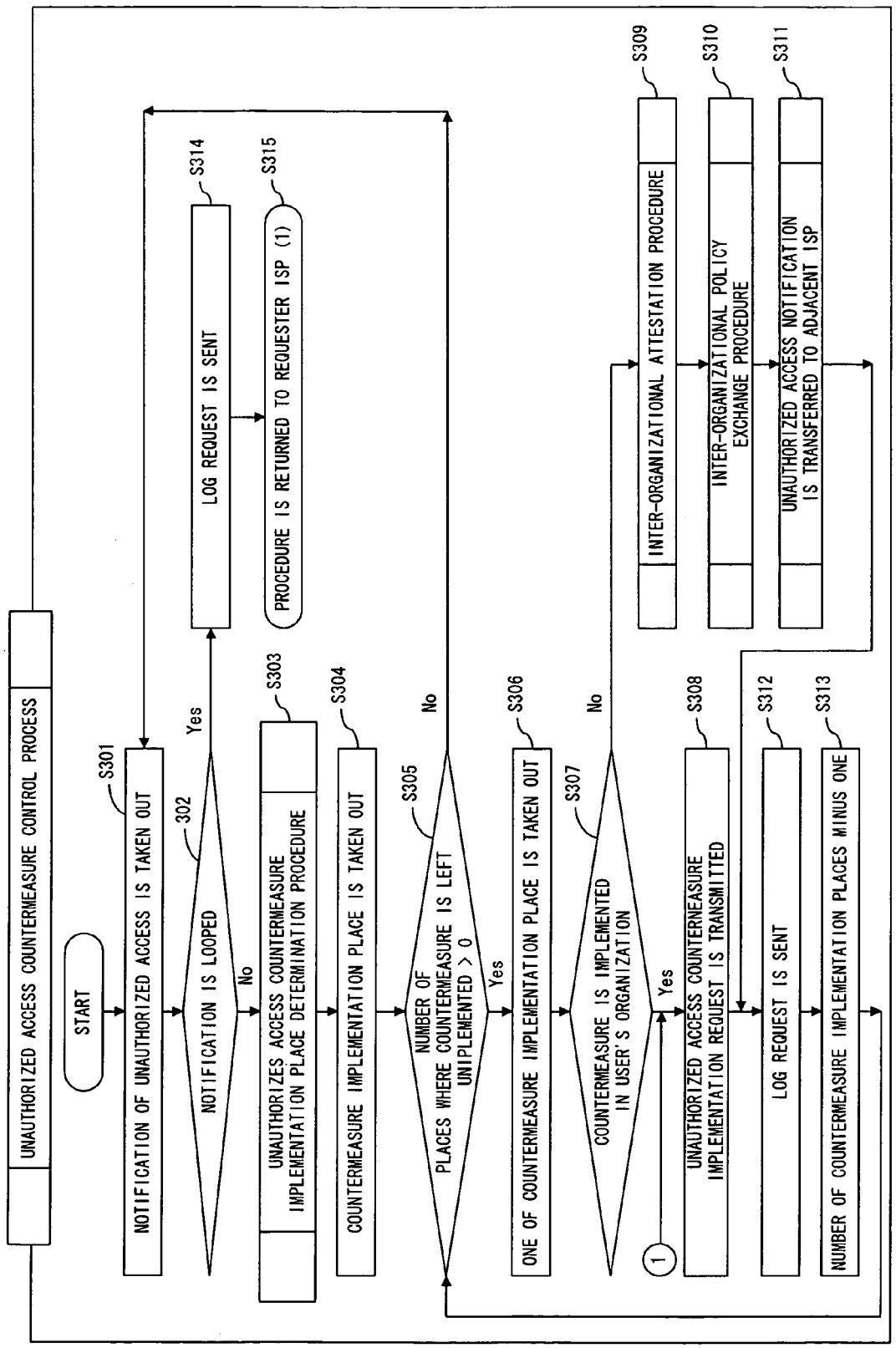
FIG. 9 shows the contents of unauthorized access countermeasure control procedure.

Next, FIG. 9 is described below. FIG. 9 is a flowchart showing the contents of the unauthorized access countermeasure control procedure that is performed by the unauthorized access countermeasure control unit 111.

In S301, one piece of notification of unauthorized access is taken out from the unauthorized access notification agent site 200.

In S302, the Detecting ID indicated in this taken-out unauthorized access notification is referred to, and it is judged whether this Detecting ID was indicated in the unauthorized access notification obtained in the past, and more specifically, whether the same Detecting ID as this Detecting ID is recorded in Log DB 140. If the result of this judgement is yes, the procedure proceeds to S314, and if it is no, the procedure proceeds to S303.

In S303, an unauthorized access countermeasure implementation place determination procedure is executed. The details of this procedure are shown in the flow chart of FIG. 10. Described below is this procedure shown in FIG. 10.

In S321, an inquiry is made of the operation management system 501, and a list of edge routers 503 installed in the ISP network 500 is obtained.

In S322, an inquiry is made of the unauthorized access countermeasure implementation agent site 300, and the records complying with Time Range, Src IP, Dist IP, and Dist Port indicated in the unauthorized access notification that are taken out in the procedure of S301 are extracted from the traffic DB 320. All the edge routers 503 other than the edge router 503 into which the traffic indicated in the extracted records flows are excluded from the list of edge routers 503 obtained in the above procedure.

In S323, a transiently-connected edge router installed for a transiently-connected user terminal is extracted from the edge router 503 that is left in the list of edge routers, and the Connecting ID indicated in the data records related to the unauthorized access notification is obtained from the stored data in the traffic DB 320 for the extracted transiently-connected edge router.

In S324, an inquiry is made of the operation management system 501 as to whether a user who is identified by the Connecting ID obtained by the above procedure is connected to the ISP network 500 at present. If this user is connected to the ISP network 500 at present, the transiently-connected edge router into which a packet flows from the transiently-connected user terminal used by this user at present is extracted, and this transiently-connected user terminal is left in the list of edge routers. If this user is not connected to the ISP network 500 at present, the transiently-connected edge router into which unauthorized access is made to flow from the transiently-connected user terminal used by this user is excluded from the above list of edge routers.

In S325, whether the countermeasure for the unauthorized access related to the notification should be implemented in the user's organization or whether the implementation of the countermeasure should be entrusted to another organization is classified based on each connection destination side of the edge router 503 that is left in the list.

The criterion of this classification is, more specifically, that if the edge router 503 that is left in the list is a transiently-connected edge router or an ISP edge router installed in the border with an adjacent ISP having no reliable relationship with the ISP network 500, the countermeasure should be implemented by this ISP edge router 503 in the user's organization. If the edge router 503 that is left in the list is an ISP edge router installed on the border with an adjacent ISP having a reliable relationship with the ISP network 500, the countermeasure should not be implemented by this ISP edge router, but the implementation of the countermeasure should be entrusted to the adjacent ISP. The place in which the countermeasure against the unauthorized access related to the notification is entirely determined by this procedure.

Figure 10:
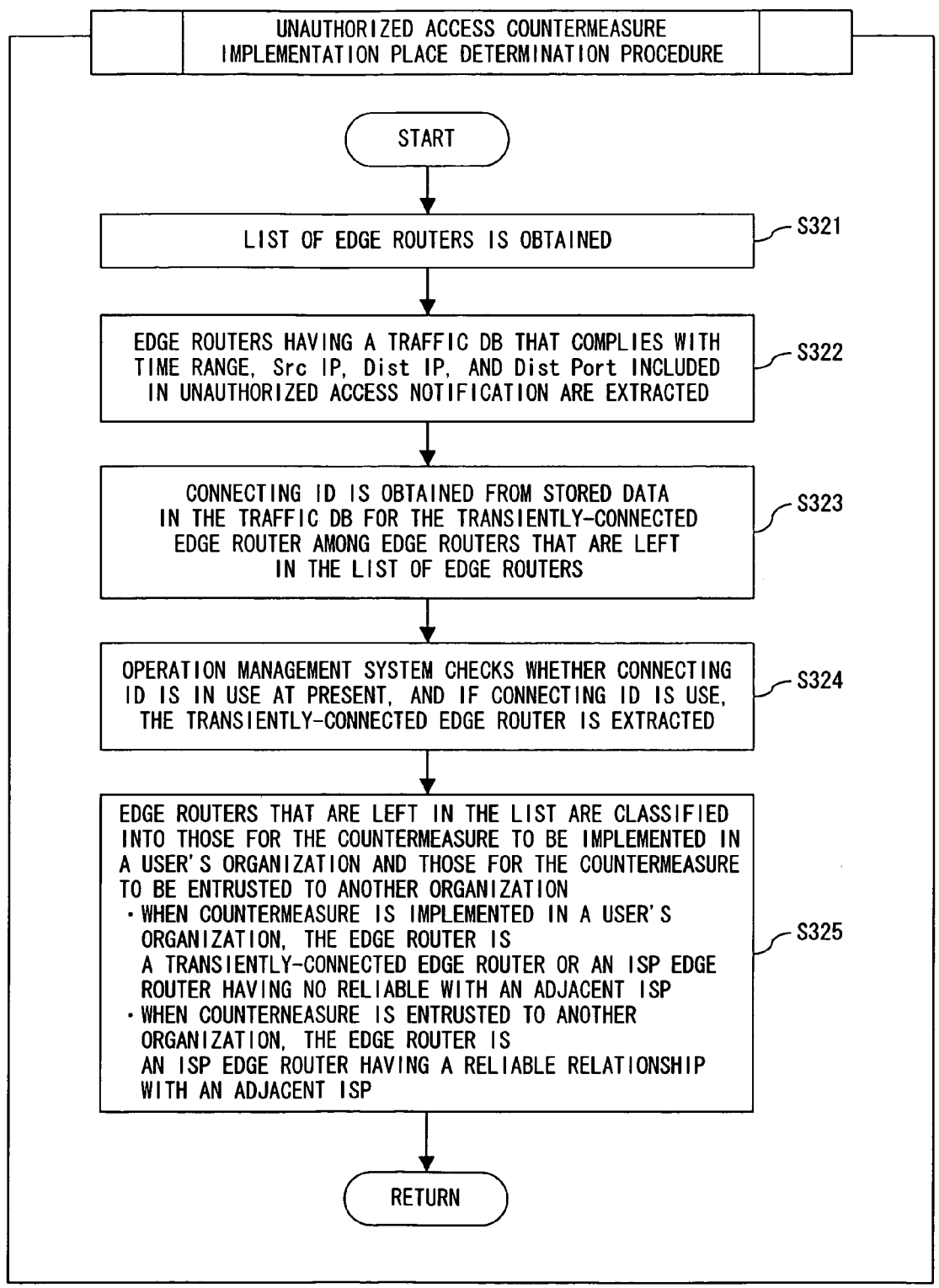
FIG. 10 shows the contents of unauthorized access countermeasure implementation place determination procedure.

Back to FIG. 9 from the procedure of S325 shown in FIG. 10.

In S304 in FIG. 9, the countermeasure implementation places obtained by the unauthorized access countermeasure implementation place determination procedure are taken out.

In S305, it is judged whether the number of places where the countermeasure is left unimplemented among the countermeasure implementation places taken out by the procedure of S304 is larger than 0. If the result of the judgement is yes, that is, if there is any place where the countermeasure is left unimplemented, the procedure proceeds to S306. If the result of the judgement is no, that is, if the countermeasure has been implemented at all the places where the countermeasure should be implemented, the procedure is returned to S301 to repeat the above-mentioned procedures.

In S306, one place where the countermeasure is left unimplemented among the countermeasure implementation places taken out by the procedure of S304 is taken out.

In S307, it is judged whether the place taken out by the above procedure is the edge router 503 that implements the countermeasure in the user's organization. If the result of this judgement is yes, the procedure is made to proceed to S308. If the result of the judgement is no, that is, if this place is the ISP edge router that entrusts the implementation of the countermeasure to the adjacent ISP, the procedure is made to proceed to S309.

In S308, an unauthorized access countermeasure implementation request is transmitted to the unauthorized access countermeasure implementation agent site 300 that controls the edge router 503 that is the place taken out by the above procedure. After then, the procedure proceeds to S312.

Information that identifies the edge router 503 that is made to implement the countermeasure is indicated in the unauthorized access countermeasure implementation request, and the unauthorized access notification taken out by the processing of S301 is affixed to said request. In the unauthorized access countermeasure implementation agent site 300 that receives this request, the unauthorized access countermeasure implementation procedure is executed by the unauthorized access countermeasure implementation engine 311.

Figure 11:
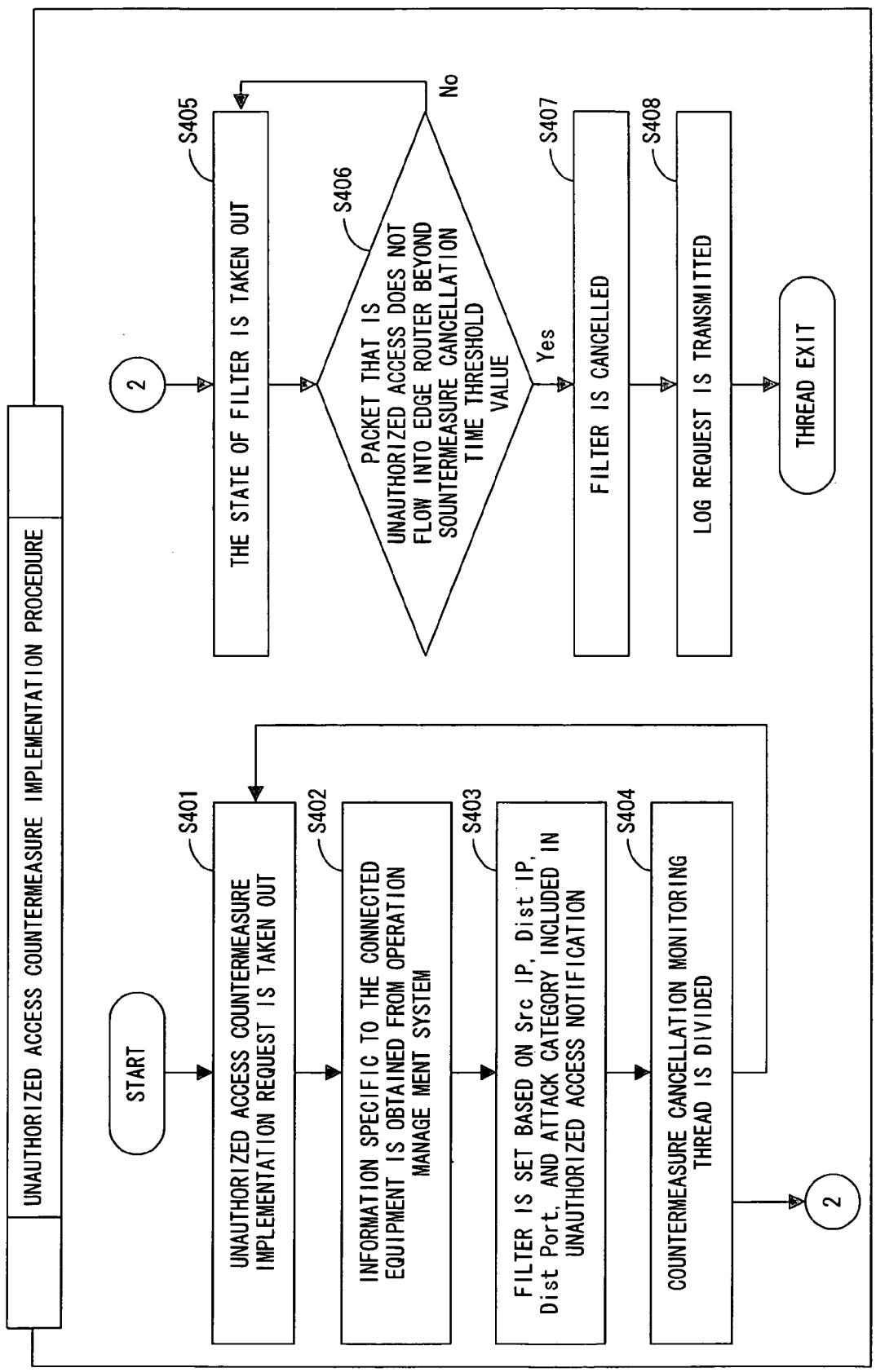
FIG. 11 shows the contents of unauthorized access countermeasure procedure.

Described in the flowchart shown in FIG. 11 are the details of the unauthorized access countermeasure implementation procedure.

In S401, an unauthorized access countermeasure implementation request is obtained from the unauthorized access countermeasure manager site 100.

In S402, an inquiry is made of the operation management system 501, and specific information required to control the edge router 503 indicated in the unauthorized access countermeasure implementation request, for example, the equipment type of the edge router 503 and the manager ID and password for managing the equipment are obtained.

In S403, the edge router 503 is controlled using the specific information obtained by the above procedure, and the edge router 503 is set a filter that shuts off the passing of the same packet as the unauthorized access related to the unauthorized access notification based on Src IP, Dist IP, Dist Port, and Attack Category included in the unauthorized access notification affixed to the unauthorized access countermeasure implementation request.

In S404, the thread is divided. Repetitive procedures from S401 to S403 are executed, on one hand, and procedures from S405 to S408 are executed, on the other hand.

In S405, the state of the filter set by the procedure of S403 is taken out from the edge router 503. In S406, it is judged from the state of the filter taken out by the above step whether the packet that is unauthorized access continuously flows into the edge router 503 beyond a countermeasure cancellation time threshold value. If the result of this judgement is yes, that is, if the packet that is unauthorized access continuously flows into the edge router 503 beyond a countermeasure cancellation time threshold value, the procedure is made to proceed to S407. If the result of this judgement is no, that is, if the packet that is unauthorized access still flows into the edge router 503 or if the continuation time during which the packet that is unauthorized access does not flow into the edge router 503 is shorter than a countermeasure cancellation time threshold value, the procedure is returned to S405 to repeat the above-mentioned procedures. The countermeasure cancellation time threshold value will be described later.

In S407, the edge router 503 is controlled and the filter set by the procedure of S403 is cancelled.

In S408, a log request is transmitted to the unauthorized access countermeasure recording control unit 112 in the unauthorized access countermeasure manager site 100, and recording of the completion of the countermeasure implementation is requested. The unauthorized access notification obtained by the procedure of S301 is affixed to this log request.

After the procedure of S408 is finished, the threads from S405 to S408 that are divided by the procedure of S404 are made to finish.

It is by executing the above-mentioned unauthorized access countermeasure implementation procedure that a countermeasure against unauthorized access is implemented, and a customer network is protected from the unauthorized access.

Back to the description of the procedure shown in FIG. 9. If the result of the judgement in the procedure of S307 is no, that is, if the place taken out by the procedure of S306 is the ISP router that entrusts the implementation of the countermeasure against unauthorized access to the adjacent ISP, an inter-organizational attestation procedure is executed in S309. The details of this procedure are described in the flowchart shown in FIG. 12.

Figure 12:
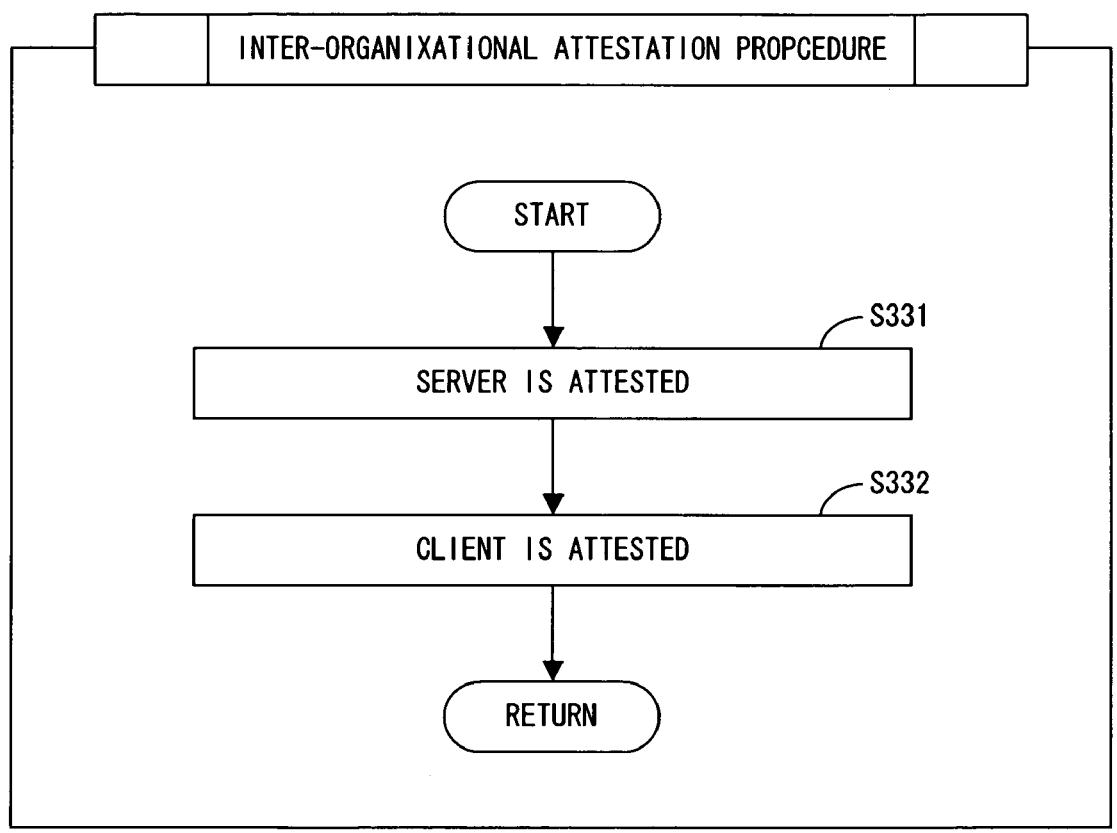
FIG. 12 shows the contents of inter-organizational attestation procedure.

Then, described below is the procedure shown in FIG. 12.

In S331, server attestation processing is executed using a certificate 120, and it is confirmed that the adjacent ISP (server), that is the request destination side of the countermeasure, is certainly the ISP having a reliable relationship and is not a disguise of a malicious site.

In S332, client attestation processing is executed using the certificate 120, and it is confirmed in the ISP, that is the request destination side of the countermeasure, that the ISP network 500 (client), that is the requester of the countermeasure, is certainly the ISP having a reliable relationship and is not a disguise of a malicious site.

When this procedure of S332 finishes, the procedure is returned to FIG. 9.

It is by executing the above inter-organizational attestation procedure that the theft of information on unauthorized access countermeasures by a disguise of a malicious site can be prevented.

Figure 13:
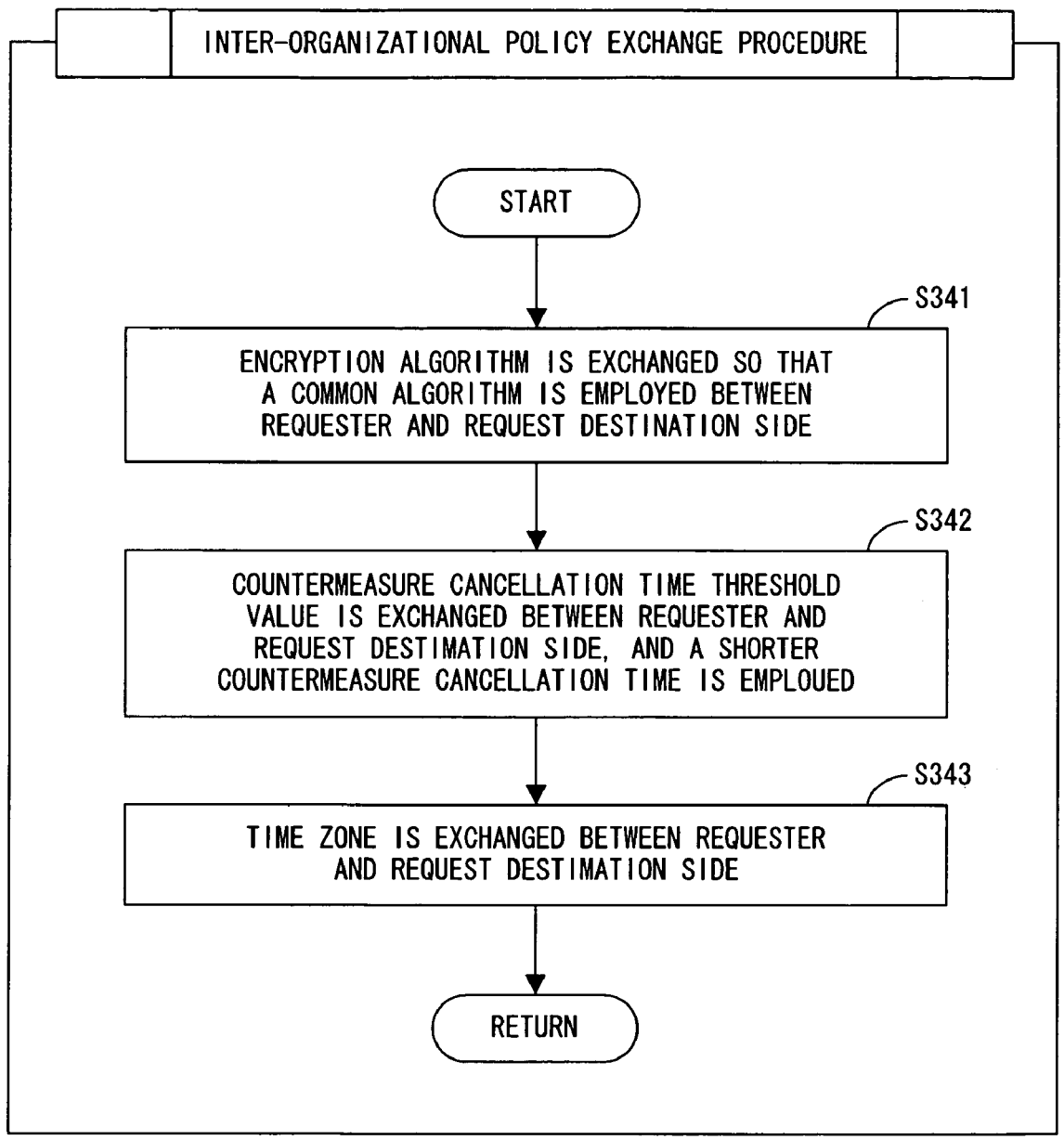
FIG. 13 shows the contents of inter-organizational policy exchange procedure.

In the procedure of S310 following the procedure of S309 shown in FIG. 9, an inter-organizational policy exchange procedure is executed. The details of this procedure are shown in the flowchart of FIG. 13. Then, described below is the procedure shown in FIG. 13.

In S341, in order to make the reading of information by a third party impossible, an encryption algorithm is exchanged between the ISP network 500 that is the requester of the countermeasure and the adjacent ISP that is the request destination side of the countermeasure.

In S342, the user's countermeasure cancellation time threshold value is exchanged between the ISP network 500 that is the requester and the adjacent ISP that is the request destination side, and a shorter countermeasure cancellation time of the two is employed as the countermeasure cancellation time threshold value between both networks.

Described below is a countermeasure cancellation time threshold value.

A countermeasure cancellation time threshold value is a threshold value indicating how long a countermeasure against unauthorized access is continued after no unauthorized access is detected any more. This threshold value is individually set in each ISP according to the security policy on the user's network operation. In the embodiment of the present invention, if different values are set between the two ISPs, the threshold value indicating a shorter time is employed for the unauthorized access transmitted by both ISPs. This is because it is taken into consideration that if a longer time is used as the threshold value, a possibility that authorized access, that is not unauthorized access, is shut off as well continues all the longer.

If the countermeasure cancellation time threshold value of the requester of the countermeasure that is indicated in Policy 130 is set to, for example, ten minutes, and if the countermeasure cancellation time threshold value of the request destination side is set to, for example, twenty minutes, ten minutes are employed as the countermeasure cancellation time threshold value for the unauthorized access transmitted by both networks.

When the countermeasure cancellation time threshold value of the countermeasure cancellation policy indicated in the unauthorized access notification shows a shorter time than the countermeasure cancellation time threshold value that is determined in such a way as mentioned above, the countermeasure cancellation time threshold value of the countermeasure cancellation policy is employed as a countermeasure cancellation time threshold value so as to follow a client's instructions.

In S343, a time zone (information on time zone by area) is exchanged between the ISP network 500 that is the requester of the countermeasure and the adjacent ISP that is the request destination side of the countermeasure. The exchange of information on time zone by area is conducted to enable both networks to indicate the time information required when they record the contents of the countermeasure in terms of their local time, thus improving the convenience in using the unauthorized access prevention system embodying the present invention.

When this procedure of S343 finishes, the procedure returns to that of FIG. 9. By executing the inter-organizational policy exchange procedure, even if a security policy on network operation differs between organizations, it is possible to have a request destination side implement a countermeasure against unauthorized access after the difference is adjusted.

In the procedure of S311 following S310 shown in FIG. 9, the unauthorized access notification taken out by the procedure of S301 is transferred to the adjacent ISP that is the request destination side. At that time, if the value of the countermeasure policy indicated in the unauthorized access notification taken out by the procedure of S301 differs from the countermeasure cancellation time threshold value employed in executing the inter-organizational policy exchange procedure, said countermeasure cancellation time threshold value is overwritten as a countermeasure cancellation policy value and is transferred to the adjacent ISP that is the request destination side of the countermeasure.

In S312, a log request is sent to the unauthorized access countermeasure record control unit 112, and recording of the contents of the processing that is performed in the procedure of S308 or in the procedures from S309 to S311 is requested. The unauthorized access notification obtained by the procedure of S301 is affixed to this log request.

In S313, the number of the countermeasure implementation places obtained by the unauthorized access countermeasure implementation place determination procedure of S303 is decreased by one, and the procedure is returned to S305 to repeat the above-mentioned processing.

If the result of the judgement in the procedure of S302 is yes, there is a fear that the transfer of an unauthorized access notification is only repeated between ISPs (an unauthorized access notification is looped), and that no countermeasure against unauthorized access is implemented at all.

In this case, in S314, a log request is sent to the unauthorized access countermeasure record control unit 112, and recording to the effect that a looped unauthorized access notification has been obtained is requested. The unauthorized access notification obtained by the procedure of S301 is affixed to this log request.

After then, in S315, an instruction is given to the unauthorized access countermeasure manager site 100 of the ISP of the notification source (i.e. the requester of the unauthorized access countermeasure request) that sends the unauthorized access notification obtained by the procedure of S301 to start the unauthorized access countermeasure control procedure that is being executed there from S308, and by so starting said procedure, a countermeasure against the unauthorized access related to this unauthorized access notification is implemented in said ISP.

By executing the above unauthorized access countermeasure control procedure, implementation of the countermeasure against unauthorized access is instructed, and a customer network is protected from unauthorized access.

Figure 14:
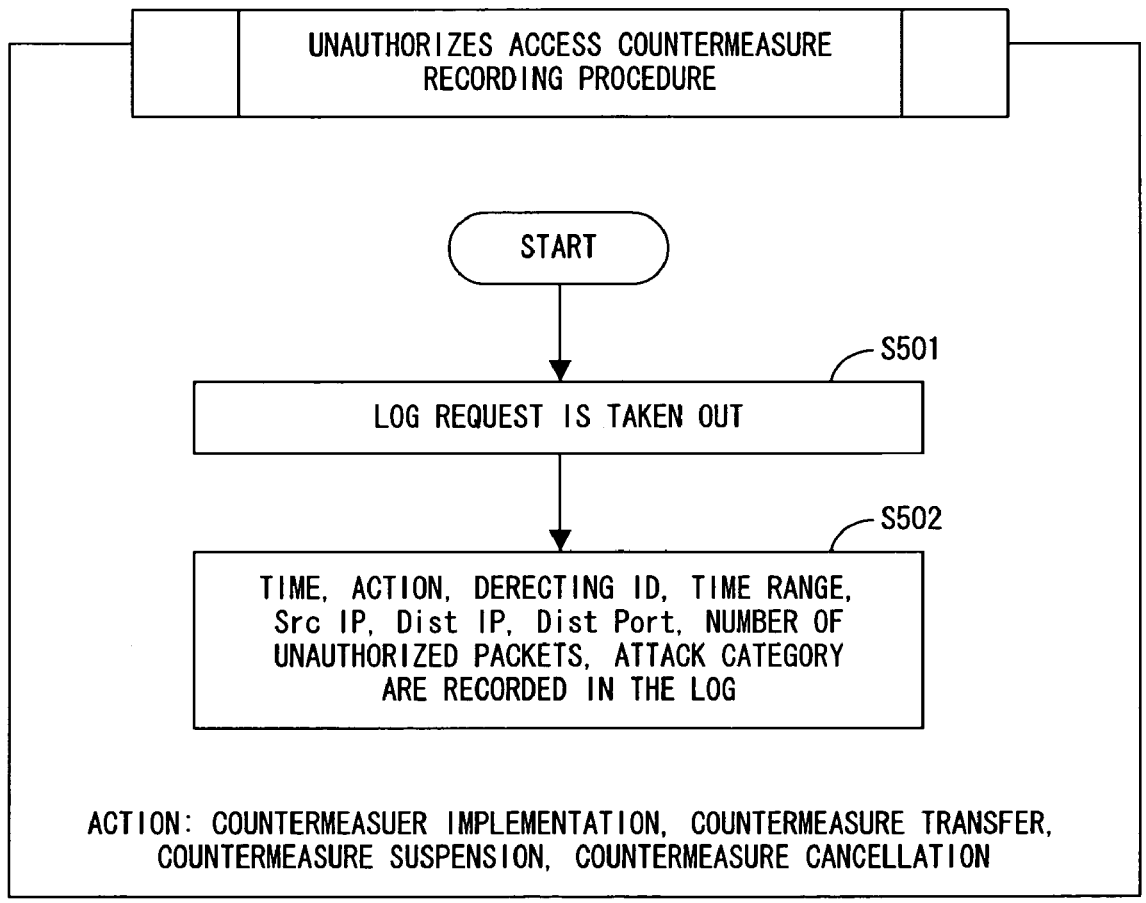
FIG. 14 shows the contents of unauthorized access countermeasure recording procedure.

Next, FIG. 14 is described. FIG. 14 is a flowchart showing the contents of the unauthorized access countermeasure record procedure executed by the unauthorized access countermeasure record control unit 112.

In S501, a log request that is transmitted from the unauthorized access countermeasure control unit 111 and the unauthorized access countermeasure engine 311 in the unauthorized access countermeasure implementation agent site 300 is taken out.

In S502, Time, Action, Detecting ID, Time Range, Src IP, Dist IP, Dist Port, Number of Unauthorized Packets, Attack Category are recorded in the log based on the taken-out log request and are stored in the Log DB 140. "Action" stands for information indicating that when what kind of countermeasure is implemented, the recording of the log is requested, such as implementation of countermeasure, transfer of countermeasure (request of countermeasure to an adjacent ISP), cancellation of countermeasure, and suspension of countermeasure.

After this procedure of S502 finishes, the procedure is returned to S501. After then, the above procedures of taking out a log request and recording it in the log are repeated.

By executing the above unauthorized access countermeasure record procedure, a manager of the ISP network 500 can grasp the state of the countermeasure against unauthorized access to a customer network from the record of this history.

Various kinds of control programs executed by each constituent of the unauthorized access prevention system embodying the present invention shown in FIG. 3 can be recorded in a readable recording medium by a computer, and the present invention can be executed by making the computer read said control programs from the recording medium.

Shown in FIG. 15 is an example of the recording medium that can read the recorded control programs by a computer. Such a recording medium is, for example, RAM or ROM that is provided as a built-in or externally mounted accessory for a computer 701 or a memory 702 such as a hard disc, or a portable type recording medium 703 such as a flexible disc, MO (Magnet Optical disc) CD-ROM, CD-R/W, DVD, 8 mm video tape, and memory card.

The recording medium is connected to the computer 701 via a communication line 704. The recording medium can be a storage device 706 with which the computer that functions as a program server 705 is provided. In this case, a transmission signal obtained by modulating a carrier wave with a data signal representing the control program is transmitted from a program server 705 via a communication line 704 that is a transmission medium, and the transmission signal received is demodulated and the control program is reproduced in the computer 701, and then the control program ca be executed.

The transmission medium can be either of a wire communication medium such as a coaxial cable and metallic cables including a twist pair cable, an optical communication cable, etc. or a radio communication medium such as a satellite communication and a ground wave radio communication.

The carrier wave is an electromagnetic wave or light to modulate a data communication signal. However, the carrier wave can be a direct-current signal. In this case, the data communication signal becomes a base band waveform having no carrier wave. Therefore, the data communication signal embodied by a carrier wave can be either a modulated broadband signal or an unmodulated base band signal (corresponding to when a direct-current with a zero voltage is used as the carrier wave).

As described above in detail, the present invention searches the flowing-in path of unauthorized access to the services disclosed from the user's communication network, determines the place to implement a countermeasure for protecting the services from the unauthorized access based on the result of the search, and notifies, according to a determination that the countermeasure against the unauthorized access is implemented in the flow source that makes this unauthorized access flow into the user's communication network, the determination to a flow source.

Thus, according to the present invention, since a countermeasure against unauthorized access can be implemented at as close a place to the transmitter of the unauthorized access as possible, it is possible to prevent DDoS effectively.

What is claimed is:

1. An unauthorized access prevention system which resides within a user's communication network the unauthorized access prevention system comprising:
    a traffic recording unit for recording information on traffic that flows into the user's communication network and arrives in a customer site;
    a search unit for searching, from the information recorded in the traffic recording unit, the flowing-in path of unauthorized access, which is transmitted from a transmitter and is included in the traffic, to services disclosed from the customer site to other communication networks adjacent to the user's communication network via the user's communication network;
    a determination unit for determining a plurality of countermeasure implementation planning places from among a plurality of places, which include the other communication networks, edge routers of the user's communication network each of which is arranged on each border of the other communication networks, and POP (point of presence) edge routers within the user's communication network, the plurality of places being for protecting the services from the unauthorized access based on a result of the search; and
    a notification unit for notifying at least one or more notified parties, which include other unauthorized access prevention systems each of which resides within the other communication networks, the edge routers of the user's communication network, and the POP edge routers within the user's communication network, of the determination of the countermeasure implementation planning places, when the determination unit determines the notified parties as the countermeasure implementation planning places for a reason that the unauthorized access was flowed into the user's communication network, wherein:

the notification unit notifies the other unauthorized access prevention systems of the determination when the determination unit determines the other communication networks as the countermeasure implementation planning places, and the notification unit notifies the edge routers or the POP edge routers of the determination when the other communication networks do not have a reliable relationship with the users' communication network even if the determination unit determines the other communication networks as the countermeasure implementation planning places.

2. A recording medium in which a program that directs a computer residing within a user's communication network to implement a countermeasure against unauthorized access is recorded and in which the program can be read by the computer, and the program directs the computer to perform the following processes by being executed by the computer:

a detection process of detecting an unauthorized access transmitted from a transmitter to services disclosed from a customer site to other communication networks adjacent to the user's communication network via the user's communication network; and when the detection of the unauthorized access is notified, performs the following processes:

a search process of searching the flowing-in path of the unauthorized access to the services disclosed from the customer site;

a determination process of determining a plurality of countermeasure implementation planning places from among a plurality of places, which include the other communication networks, edge routers of the user's communication network each of which is arranged on each border of the other communication networks, and POP (point of presence) edge routers within the user's communication network, the plurality of places being for protecting the services from the unauthorized access based on a result of the search; and a notification process of notifying at least one or more notified parties, which include other unauthorized access prevention systems each of which resides within the other communication networks, the edge routers of the user's communication network, and the POP edge routers within the user's communication network, of the determination of the countermeasure implementation planning places, when it is determined that the notified parties are the countermeasure implementation planning places for a reason that the unauthorized access was flowed into the user's communication network, wherein:

the notification process notifies the other unauthorized access prevention systems of the determination when it is determined that the other communication networks are the countermeasure implementation planning places, and the notification process notifies the edge routers or the POP edge routers of the determination when the other communication networks do not have a reliable relationship with the users' communication network even if it is determined that the other communication networks are the countermeasure implementation planning places.

3. The recording medium according to claim 2, wherein the process of searching the flowing-in path is performed by the computer based on the monitoring information on the traffic transmitted by the user's communication network and the unauthorized access information indicating the contents of the unauthorized access.

4. The recording medium according to claim 3, wherein the monitoring information includes at least the position information on the edge routers and the monitoring information on the traffic that flows into the user's communication network via one of the edge routers.

5. The recording medium according to claim 2, wherein the notification process makes the computer execute a process of notifying the determination to the other communication networks after mutual attestation is conducted with the other communication networks when it is determined that the other communication networks are determined as the countermeasure implementation planning places.

6. The recording medium according to claim 2, wherein when the other communication networks are determined as the countermeasure implementation planning places, the process of notifying the determination to the other communication networks is performed by the computer after information on a security policy for the operation of each network is exchanged with the other communication networks.

7. The recording medium according to claim 6, wherein information on a security policy is the information indicating the time required until the countermeasure against the unauthorized access is cancelled after the unauthorized access is not detected any more.

8. The recording medium according to claim 7, wherein when the time indicated by the information on the security policy differs between the user's communication network and the other communication networks, a shorter time of the two is used as the time required until the countermeasure against unauthorized access is cancelled after the unauthorized access is not detected any more.

9. The recording medium according to claim 8, wherein the process of notifying the other communication networks of the determination and the information indicating the time required until the countermeasure against the unauthorized access is cancelled after the unauthorized access is not detected any more is performed by the computer.

10. The recording medium according to claim 2, wherein the process of notifying the other communication networks of the determination using the communication path that differs from the flowing-in path of the unauthorized access is performed by the computer.

11. The recording medium according to claim 2, wherein by having the program executed by the computer, the unauthorized access countermeasure implementation control process that has the countermeasure for protecting the services from the unauthorized access implemented at the edge routers or the POP edge routers based on the determination of the countermeasure implementation planning places is performed by the computer.

12. The recording medium according to claim 11, wherein the process of identifying one of the POP edge routers to which the transmitter is connected based on the information obtained from the operation management system that manages the operation of the user's communication network is further performed by the computer, when it is determined that the POP edge routers are the countermeasure implementation planning places.

13. The recording medium according to claim 11, wherein by having the program executed by the computer:

the process of obtaining a notification of the determination that unauthorized access to the services disclosed from a service-disclosed communication network different from the user's communication network is made to flow into the service-disclosed communication network is further performed by the computer; and the process of implementing the countermeasure for protecting the services disclosed from said service-disclosed communication network from the unauthorized access related to the notification at the edge routers or the POP edge routers when the notification is obtained by the notification obtaining process is performed by the computer.

14. The recording medium according to claim 11, wherein the countermeasure implemented by the unauthorized access countermeasure implementation control process is cancelled after the unauthorized access is not detected any more and a preset time passes.

15. The recording medium according to claim 14, wherein the preset time is set based on the security policy on the network operation of both the user's communication network and the service-disclosed communication network.

16. The recording medium according to claim 15, wherein when the times set between the user's communication network and the service-disclosed communication network based on the security policy on the network operation of both networks differ between both networks, the countermeasure is cancelled after the unauthorized access is not detected any more and a shorter time of the two passes.

17. The recording medium according to claim 2, wherein by having the program executed by the computer:

the process of obtaining a notification of the determination that unauthorized access to the services disclosed from a service-disclosed communication network different from the user's communication network is made to flow into said service-disclosed communication network is performed by the computer;

the process of searching the flowing-in path of the unauthorized access related to the notification in the user's communication network when the notification is obtained by the notification obtaining process is performed by the computer;

the process of determining the place to implement the countermeasure for protecting the services disclosed from said service-disclosed communication network from the unauthorized access related to the notification based on the result of the search when the notification is obtained by the notification obtaining process is performed by the computer; and the process of notifying, according to a determination that the countermeasure is implemented in the other communication networks that makes the unauthorized access related to the notification flow into the user's communication network when the notification is obtained by the notification obtaining process, the determination to the other communication networks is performed by the computer.

18. The recording medium according to claim 17, wherein by having the program executed by the computer:

the unauthorized access countermeasure implementation control process that has the countermeasure for protecting the services disclosed from the user's communication network or the service-disclosed communication network from the unauthorized access related to the notification implemented in the communication network of the notification source of the notification when the notification obtained by said notification obtaining process is the same as that obtained in the past is further performed by the computer.

19. The recording medium according to claim 18, wherein the process of notifying the information that uniquely identifies the unauthorized access related to the notification when the determination is notified is performed by the computer.

20. The recording medium according to claim 2, wherein by having the program executed by the computer:

the process of recording the history of the notification is further performed by the computer.

21. An unauthorized access prevention method performed by an unauthorized access prevention system which resides within a user's communication network, including:

searching the flowing-in path of unauthorized access transmitted from a transmitter to services disclosed from a customer site to other communication networks adjacent to the user's communication network via the user's communication network;

determining a plurality of countermeasure implementation planning places from among a plurality of places, which include the other communication networks, edge routers of the user's communication network each of which is arranged on each border of the other communication networks, and POP (point of presence) edge routers within the user's communication network, the plurality of places being for protecting the services from the unauthorized access based on a result of the search; and notifying at least one or more notified parties, which include other unauthorized access prevention systems each of which resides within the other communication networks, the edge routers of the user's communication network, and the POP edge routers within the user's communication network, of the countermeasure implementation planning places, when it is determined that the notified parties are the countermeasure implementation planning places for a reason that the unauthorized access was flowed into the user's communication network, wherein:

the notifying notifies the other unauthorized access prevention systems of the determination when it is determined that the other communication networks are the countermeasure implementation planning places, and the notifying notifies the edge routers or the POP edge routers of the determination that the other communication networks do not have a reliable relationship with the users' communication network even if it is determined that the other communication networks are the countermeasure implementation planning places.

22. A recording medium in which a program that directs a computer residing within a user's communication network to implement a countermeasure against unauthorized access is recorded and in which the program can be read by the computer, and the program directs the computer to perform the following processes by being executed by the computer:

a detection process of detecting an unauthorized access transmitted from a transmitter to services disclosed from a customer site to other communication networks adjacent to the user's communication network via the user's communication network; and when the detection of the unauthorized access is notified, performs the following processes:

a search process of searching the flowing-in path of the unauthorized access to the services disclosed from the customer site;

a determination process of determining a plurality of countermeasure implementation planning places from among a plurality of places, which include the other communication networks, edge routers of the user's communication network each of which is arranged on each border of the other communication networks, and POP (point of presence) edge routers within the user's communication network, the plurality of places being for protecting the services from the unauthorized access based on a result of the search; and a notification process for judging whether other communication networks are notified of the determination, when it is determined that the other communication networks are the countermeasure implementation planning places for a reason that the unauthorized access was flowed into the user's communication network, wherein:

the notification process notifies other unauthorized access prevention systems each of which resides within the other communication networks of the determination of the countermeasure implementation planning places, when it is judged that the other communication networks are notified of the determination, the notification process notifies the edge routers or the POP edge routers of the determination that the other communication networks do not have a reliable relationship with the users' communication network even if it is judged that the other communication networks are notified of the determination, and by having the program executed by the computer;

an unauthorized access countermeasure implementation control process that has the countermeasure for protecting the services from the unauthorized access implemented in the user's communication networks when it is judged that the determination will not be notified to the other communication networks based on the above notification process is further performed by the computer.

23. The recording medium according to claim 22, wherein the judgement is made based on judgement information on the other communication networks that is given in advance.

* * * * *